(12) United States Patent
Shibata

(10) Patent No.: US 7,955,215 B2
(45) Date of Patent: Jun. 7, 2011

(54) CONTROL DEVICE FOR VEHICULAR DRIVE SYSTEM

(75) Inventor: Hiroyuki Shibata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 714 days.

(21) Appl. No.: 12/003,033

(22) Filed: Dec. 19, 2007

(65) Prior Publication Data

US 2008/0153661 A1   Jun. 26, 2008

(30) Foreign Application Priority Data

Dec. 25, 2006  (JP) ................................ 2006-348597

(51) Int. Cl.
*B60K 1/02* (2006.01)
*B60W 10/04* (2006.01)
(52) U.S. Cl. ...................................... 477/3; 180/65.285
(58) Field of Classification Search .. 477/3; 180/65.285
See application file for complete search history.

(56) References Cited

U.S. PATENT DOCUMENTS

| 7,396,316 B2* | 7/2008 | Tabata et al. ................... 477/107 |
| 7,503,870 B2* | 3/2009 | Tabata et al. ...................... 477/3 |
| 7,534,190 B2* | 5/2009 | Tabata et al. ...................... 477/3 |
| 7,549,944 B2* | 6/2009 | Tabata et al. ...................... 477/5 |
| 7,566,288 B2* | 7/2009 | Tabata et al. ...................... 477/4 |
| 7,618,343 B2* | 11/2009 | Tabata et al. ...................... 477/3 |
| 2005/0272555 A1* | 12/2005 | Tabata et al. ...................... 477/2 |
| 2007/0179014 A1* | 8/2007 | Endo et al. ........................ 477/3 |
| 2008/0004156 A1* | 1/2008 | Tabata et al. ...................... 477/3 |
| 2009/0037061 A1* | 2/2009 | Tabata et al. .................... 701/55 |
| 2009/0137361 A1* | 5/2009 | Matsubara et al. ............... 477/3 |
| 2009/0248265 A1* | 10/2009 | Tabata et al. .................... 701/59 |

FOREIGN PATENT DOCUMENTS

| JP | A-2003-130203 | 5/2003 |
| JP | A-2003-301731 | 10/2003 |
| JP | A-2005-337491 | 12/2005 |

* cited by examiner

*Primary Examiner* — Roger Pang
(74) *Attorney, Agent, or Firm* — Oliff & Berridge, PLC

(57) ABSTRACT

A vehicular drive system is disclosed as including an electrically operated differential portion (16) disposed in a power transmitting path between an engine (8) and drive wheels (38) for controlling an operating state of an electric motor (M), connected to a rotary element of a differential portion (11), for controlling a differential state between an input-shaft rotation speed and an output-shaft rotation speed, and a shifting portion (20) forming a part of the power transmitting path and functioning as a step-variable automatic shifting portion. A control device (40) performs a control of output torque of the electric motor during a downshift of the step-variable shifting portion so as to suppress a variation in the engine rotation speed. The control of output torque is performed so as to increase the output torque by inertia torque of the electric motor, thereby achieving a reduction in shifting shock.

8 Claims, 13 Drawing Sheets

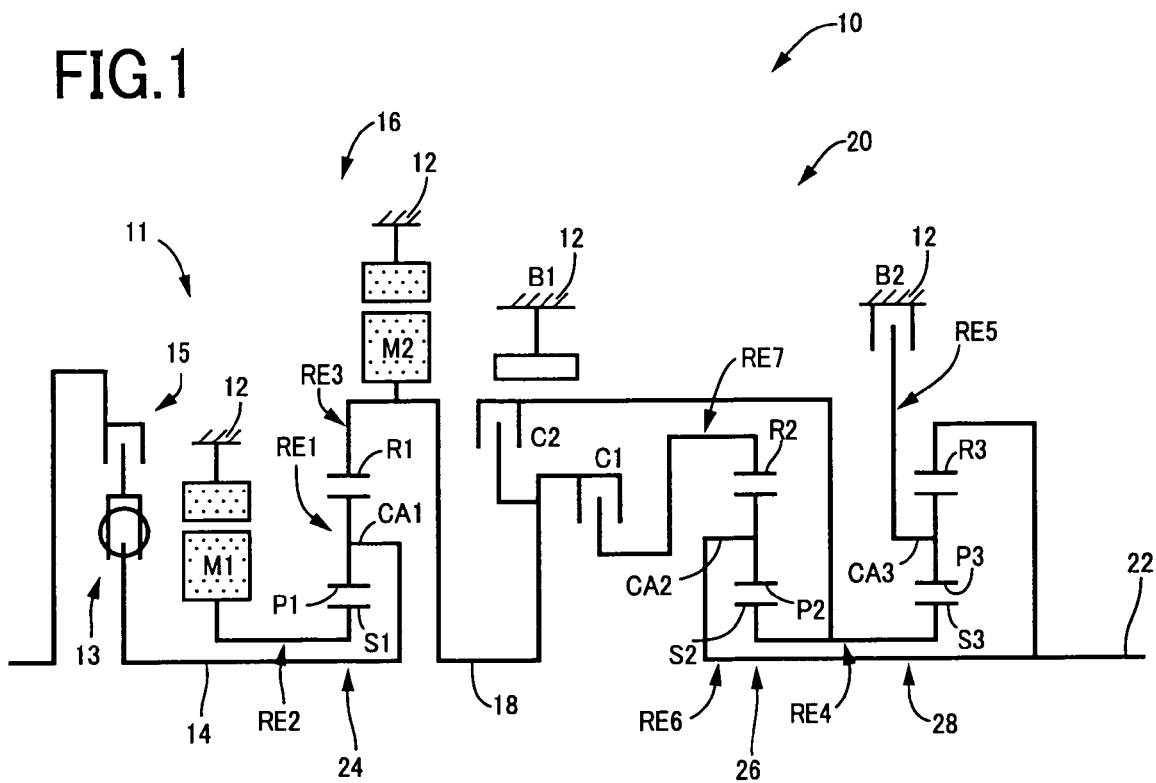

CONTROL DEVICE FOR VEHICULAR DRIVE SYSTEM

TECHNICAL FIELD

This invention relates a vehicular drive system having two shining mechanisms including a differential portion and a step-variable shifting portion and, more particularly, a control for preventing a shifting shock resulting from a shifting of the step-variable shifting portion.

BACKGROUND ART

There has heretofore been known a vehicular drive system, having two shifting mechanisms including a continuously variable transmission and a step-variable shifting portion, through which an output of a drive power source is transmitted to drive wheels. With such a vehicular drive system, in general, an overall speed ratio of the drive system is established based on speed ratios of the shifting mechanisms.

As one example of the continuously variable transmission, there has heretofore been known a drive system, including a differential mechanism for distributing an output of an engine to a first electric motor and an output shaft, and a second electric motor disposed between an output shaft of the differential mechanism and drive wheels, which functions as a continuously variable transmission. For instance, Patent Publication 1 (Japanese patent Application Publication No. 2003-301731) discloses a hybrid vehicular drive system that corresponds to such a drive system mentioned above.

With such a hybrid vehicular drive system, a differential mechanism is comprised of, for instance, a planetary gear set, which performs a differential action to mechanically transmit a major part of drive power from the engine to the drive wheels while a remnant of drive power from the engine is electrically transmitted from the first electric motor to the second electric motor using an electric path. This causes a control device to allow the differential mechanism to function as an electrically controlled continuously variable transmission to electrically and continuously vary the speed ratio. This allows the engine to operate in an optimum operating state while enabling a vehicle to run, thereby enabling improvement in fuel consumption.

One example of the vehicular drive system having two shifting mechanisms, there has heretofore been known a drive system including, for instance, a step-variable automatic transmission (hereinafter referred to as "a step-variable transmission") as a transmission incorporated in a power transmitting path between an output member of an electrically controlled continuously variable transmission and drive wheels. For instance, Patent Publication 2 (Japanese patent Application Publication No. 2003-130203) discloses a hybrid vehicular drive system that corresponds to such a drive system mentioned above.

With such a hybrid vehicular drive system, the drive system has an overall speed ratio determined based on a speed ratio of the electrically controlled continuously variable transmission and a speed ratio of the step-variable transmission. With a shifting of the electrically controlled continuously variable transmission independently controlled like a drive system equipped only with an electrically controlled continuously variable transmissions whole of the drive system is caused to function as the electrically controlled continuously variable transmission so as to allowing the vehicle to nm with the engine controlled in an optimal operating state.

During the shifting of the electrically controlled continuously variable transmission or during the operation of the step-variable transmission independently effectuated to perform the shifting, the engine rotation speed was caused to vary step-by-step with a stepwise variation in speed ratio. This resulted in a likelihood that it became difficult for the drive system as a whole to ensure continuity of the speed ratio on a stage before and after the shifting of the step-variable transmission. In other words, it was likely that the drive system could not function as a whole to operate as the continuously variable transmission on the stage before and after the shifting of the step-variable transmission. Thus, there was a likelihood that it became difficult to control the engine rotation speed so as to follow an optimal fuel consumption curve when generating required engine torque with resultant deterioration in fuel consumption.

To address such an issue, Patent Publication 3 (Japanese patent Application Publication No. 2005-337491) discloses a technology as described below. That is, during the shifting of the step-variable transmission, even if the resulting speed ratio is varied step-by-step, the electrically controlled continuously variable transmission is caused to vary a speed ratio so as to suppress such a stepwise variation in speed ratio. This allows the drive system to have an overall speed ratio, established based on the speed ratio of the electrically controlled continuously variable transmission and the speed ratio of the step-variable transmission, which is caused to continuously vary. Such an operation results in a capability of minimizing the stepwise variation of the engine rotation speed on the stage before and after the shifting of the step-variable transmission for thereby suppressing the occurrence of shifting shock.

Like a structure disclosed in Patent Publication 3 set forth above, under a circumstance where the speed ratio of the electrically controlled continuously variable transmission is caused to vary so as to suppress the stepwise variation in the speed ratio of the step-variable transmission to cause the overall speed ratio of the drive system to be continuously varied, an issue is encountered as described below. That is, although no engine rotation speed is caused to vary or the relevant variation is minimized, the step variable transmission and the electrically controlled continuously variable transmission have rotary elements whose rotation speeds vary with a resultant occurrence of inertia torque. Thus, the output torque of the drive system fluctuates by a value corresponding to inertia torque.

Patent Publication 3 proposes a method of addressing such an issue by subtracting torque from torque, generated by the electric motor forming the electrically controlled continuously variable transmission, by a torque component equivalent to inertia torque mentioned above under a situation where the overall speed ratio of the drive system is reduced, i.e., when effectuating an upshift.

However, Patent Publication 3 does not disclose a method of concretely deciding a value of torque equivalent to inertia torque mentioned above.

Further, Patent Publication 3 discloses only a case of effectuating the upshift with the overall speed ratio of the drive system being decreased and no attempt has been made to propose a method of addressing the same issue as that caused when a downshift is effectuated with the overall speed ratio of the drive system being increased.

Furthermore, under a circumstance where the downshift corresponds to a so-called coast downshift, i.e., a downshift in which a vehicle runs with an accelerator opening is zeroed or nearly zeroed, at least one electric motor is placed in a regenerative state in the hybrid vehicle drive system, causing an issue to easily arise with the occurrence of a drag of the engine.

DISCLOSURE OF THE INVENTION

The present invention has been completed with the above circumstances on the background and has an object to provide a control device for a vehicular drive system having a continuously variable transmission and a step-variable transmission which can suppress a variation in engine rotation speed even if a downshift is executed in the transmission for thereby minimizing a shifting shock.

The invention recited in claim 1 is featured by a control device for a vehicular drive system including: an electrically operated differential portion disposed in a power transmitting path between an engine and drive wheels for controlling an operating state of an electric motor connected to a rotary element of a differential portion for thereby controlling a differential state between an input-shaft rotation speed and an output-shaft rotation speed; and a shifting portion forming a part of the power transmitting path and functioning as a step-variable automatic shifting portion; the control device being comprised to perform a control of output torque of the electric motor during a downshift of the step-variable shifting portion so as to suppress a fluctuation in a rotation speed of the engine, wherein, for the control of output torque of the electric motor the control device increases the output torque by an inertia torque of the electric motor.

With such a structure, during the operation of the step-variable transmission for executing the downshift, the control device of the vehicular drive system controllably increases output torque of the electric motor by a component of inertial torque of the electric motor so as to suppress the variation in the engine rotation speed. Accordingly, the shifting shock can be minimized without causing any engine inertia torque.

Preferably, the differential portion includes a differential mechanism including a first element connected to the engine, a second element connected to a first electric motor, and a third element connected to a power transmitting member, and a second electric motor disposed in the power transmitting path between the power transmitting member and the drive wheels; the control device controls the output torque of the first electric motor so as to suppress the rotation speed of the engine during the downshift of the step-variable shifting portion; and for the control of the first electric motor, the output torque is increased by the inertia torque of the first electric motor.

With such a structure, during the operation of the step-variable transmission for executing the downshift, the control device of the vehicular drive system controllably increases output torque of the first electric motor by a component of inertial torque of the first electric motor so as to suppress the variation in the engine rotation speed. Accordingly, the shifting shock can be minimized without causing any engine inertia torque.

Preferably, the control device calculates the inertia torque of the first electric motor based on a target rotation speed of the second electric motor appearing upon completion of the downshift, a target rotation speed of the engine appearing upon completion of the downshift, a rotation speed of the second electric motor before commencement of the shifting, and a target shifting time. With such a structure, the inertia torque of the first electric motor can be calculated based on the target rotation speed of the second electric motor appearing upon completion of the downshift, the target rotation speed of the engine appearing upon completion of the downshift, the rotation speed of the second electric motor before commencement of the shifting, and the target shifting time.

Preferably, the control device calculates the inertia torque of the first electric motor based on a variation rate in an actual rotation speed of the second electric motor and a target rotation speed of the engine upon completion of the downshift. With such a structure, the inertia torque of the first electric motor can be calculated based on the variation rate in the actual rotation speed of the second electric motor and the target rotation speed of the engine upon completion of the downshift.

Preferably, the control device performs the control of the output torque of the first electric motor when a variation rate of the rotation speed of the engine exceeds a given value. With such a structure, output torque of the first electric motor is controlled when the rotation speed of the engine exceeds a given value. Accordingly, output torque of the first electric motor is controlled when the rotation speed of the engine lies at a small value, thereby preventing an engine crankshaft from rotating in a reverse direction.

Preferably, the control device increases the output torque of the first electric motor by a given value before commencement of the inertia phase during execution of the downshift. With such a structure, before the commencement of the inertia phase during the downshift being executed, output torque of the first electric motor is increased by a given amount. This enables the suppression of deterioration in shifting shock and a variation in tone quality due to an increase in a fluctuation range of the engine rotation speed.

Preferably, the control device renders the electrically operated differential portion operative as a continuously variable shifting mechanism by controlling the operating state of the electric motor. With such a structure, the electrically controlled differential portion operates as the continuously variable transmission, causing a resulting speed ratio to be continuously varied. This enables a speed ratio of a whole of the vehicular drive system to be continuously varied.

BRIEF DESCRIPTION OF THE DRAWINGS

FIG. 1 is a skeleton diagram showing structure of a vehicular drive system for use in a hybrid vehicle of one embodiment according to the present invention.

FIG. 2 is a functional diagram illustrating combined operations between a shifting operation of the vehicular drive system shown for use in a hybrid vehicle in FIG. 1 and hydraulically operated frictional coupling devices used therefor when the vehicular drive system is subjected to the continuously variable shifting or step variable shifting.

DETAILED DESCRIPTION OF THE PREFERRED EMBODIMENTS

Figure 3:
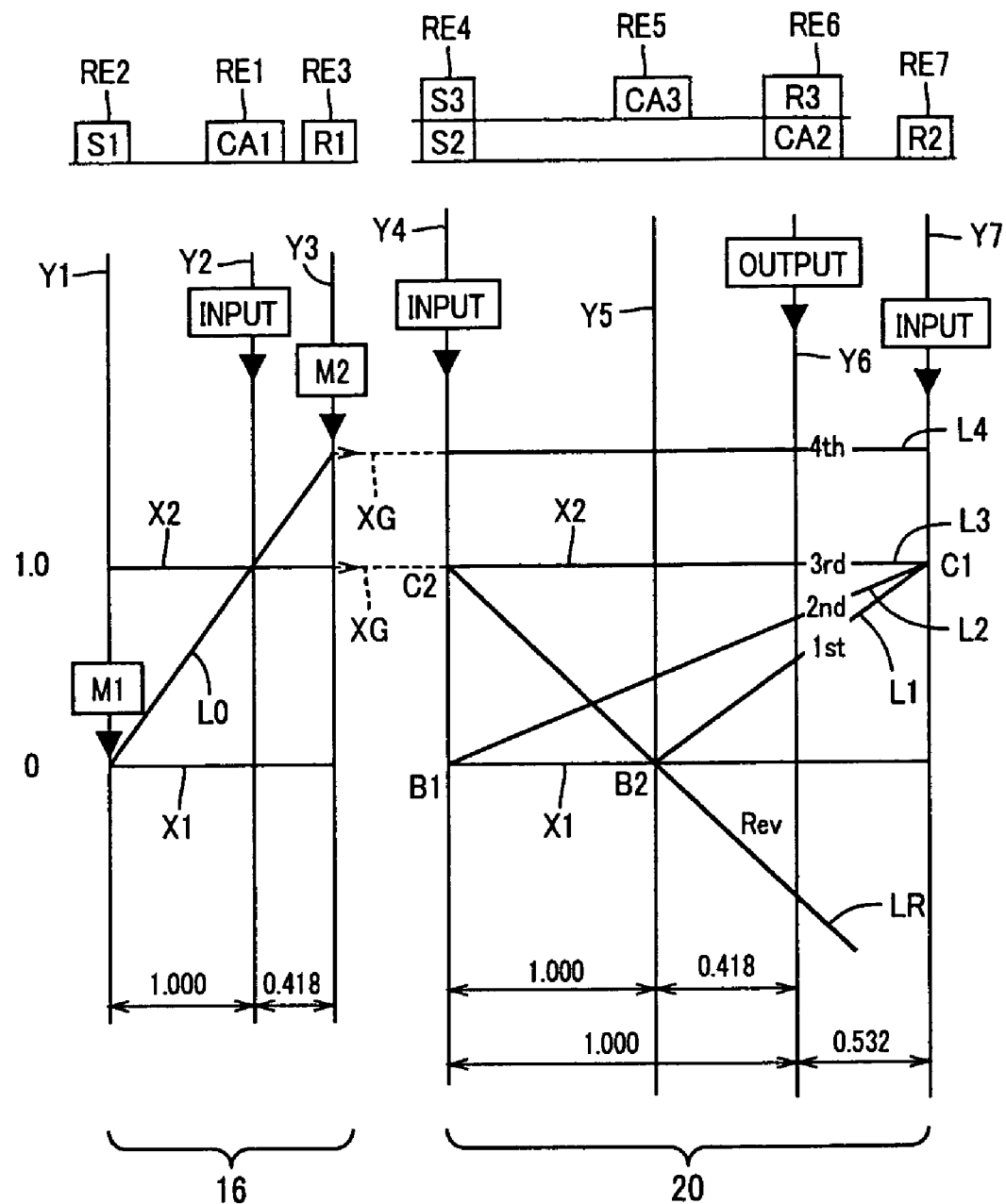
FIG. 3 is a collinear chart indicating mutually relative rotating speeds of each of gear positions when the vehicular drive system for use in a hybrid vehicle shown in FIG. 1 is subjected to the step variable shifting.

Now, various embodiments according to the present invention will be described below in detail with reference to the accompanying drawings.

Embodiment 1

FIG. 1 is a skeleton diagram for illustrating a transmission mechanism i.e., shifting mechanism 10 constituting a part of a drive system for a hybrid vehicle to which the present invention is applied. As shown in FIG. 1, the transmission mechanism i.e., shifting mechanism 10 includes a transmission case 12 (hereinafter referred to as "a case 12") mounted on a vehicle body as a non-rotary member, an input shaft 14 disposed inside the case 12 as an input rotary member coaxial therewith, a differential portion 11 coaxially connected to the input shaft 14 indirectly via a pulsation absorbing damper 13 for absorbing a torque pulsation of an engine (not shown) and a torque limiter 15, and serving as a continuously variable transmission portion, an automatic mission portion i.e., shifting portion 20 connected in series in a power transmitting path between the differential portion 11 and drive wheels (not shown) through a power transmitting member 18 (power transmitting shaft), and an output shaft 22 connected to the automatic transmission portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine (not shown) indirectly connected to the input shaft 14 via the pulsation absorbing damper 13 and the torque limiter 15 and a pair of drive wheels (not shown). The engine 8 includes an internal combustion engine such as a gasoline engine or a diesel engine or the like and serves as a drive-power source. This allows a vehicle drive force to be transferred form the engine to the pair of drive wheels in sequence through a differential gear device (final speed reduction gear) and a pair of drive axles.

With the transmission mechanism 10 of the illustrated embodiment, the engine and the differential portion 11 are directly connected to each other. As used herein, the term "direly connected" refers to a direct connection established between the associated component parts in the absence of a fluid-operated power transmitting device, such as a torque converter or a fluid coupling device or the like. It is noted that a lower half of the transmission mechanism 10, which is constructed symmetrically with respect to its axis, is omitted in FIG. 1.

The differential portion 11 includes a first electric motor M1, a power distributing mechanism 16 mechanically structured for mechanically distributing an output of the engine connected to the input shaft 14 to the first electric motor M1 and the power transmitting member 18, and a second electric motor M2 operatively connected to the power transmitting member 18 to be unitarily rotate therewith. In the illustrated embodiment, both the first and second electric motors M1 and M2 are so-called motor/generators each having a function to generate electric power. However, the first electric motor M1 has at least a function as an electric power generator for generating a reaction force.

The power distributing mechanism 16 includes a first planetary gear set 24 of a single pinion type having a gear ratio ρ1 of about "0.418", for example. The first planetary gear set 24 has rotary elements composed of a first sun gear S1, a first planetary gear P1, a first carrier CA1 supporting the first planetary gear P1 such that the first planetary gear P1 is rotatable about its axis and about the axis of the first sun gear S1, and a fist ring gear R1 meshing with the first sun gear S1 through the first planetary gear P1. When the numbers of teeth of the first sun gear S1 and the first ring gear R1 are represented by ZS1 and ZR1, respectively, the above gear ratio ρ1 is represented by ZS1/ZR1.

In the power distributing mechanism 16, the first carrier CA1 is connected to the input shaft 14, i.e., the engine (not shown); the first sun gear S1 is connected to the first electric motor M1; and the first ring gear R1 is connected to the power transmitting member 18. With the power distributing mechanism 16 of such a structure, the three elements of the first planetary gear set 24, i.e., the first sun gear S1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state to continuously vary the rotation of the power transmitting member 18 regardless of the engine operating at a given rotation speed. That is, the differential portion 11 functions as an electrically controlled continuously variable transmission to provide a speed ratio γ0 (rotation speed $N_{IN}$ of the input shaft 14/rotation speed N18 of the power transmitting member 18) that is continuously variable from a minimum value γ0min to a maximum value γ0max.

The automatic transmission portion 20 includes a single-pinion type second planetary gear set 26, and a single-pinion type third planetary gear set 28. It is a planetary gear type multiple-step transmission operable as a step-variable (three gear positions in forward running) automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a given gear ratio ρ2 of about "0.532".

The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a given gear ratio ρ3 of about "0-418". With the second sun gear S2, second ring gear R12, third sum gear S3 and third ring gear R3 having the numbers of gear teeth represented by ZS2, ZR2, ZS3 and ZR3, respectively, the gear ratios ρ2 and ρ3 are expressed by ZS2/ZR2 and ZS3/ZR3, respectively.

In the automatic transmission portion 20, the second and third sun gears S2, S3 are integrally connected to each other, selectively connected to the power transmitting member 18 through a second clutch C2, and selectively connected to the casing 12 through a first brake B1. The second carrier CA2 and third ring gear R3 which are integrally connected are connected to the output shaft 22. The second ring gear R2 is selectively connected to the transmitting member 13 via the first clutch C1, and the third carrier CA3 is connected to the casing 12 via the second brake B2.

Thus, the automatic transmission portion 20 and the differential portion 11 (power transmitting member 18) are selectively connected to each other through the first clutch C1 or the second clutch C2, which is provided to establish each gear position in the automatic tram mission portion 20. In other words, the first and second clutches C1, C2 function as coupling devices i.e., engaging device operable to place the power transmitting path between the power transmitting member 18 and the automatic transmission portion 20, that is, the power transmitting path from the differential portion 11 (power transmitting member 18) to the drive wheels, selectively in one of a power transmitting state to transmit the vehicle drive force therethrough, and the power cut-off state not to transit the vehicle drive force therethrough. That is, with at least one of the first and second clutches C1 and C2 brought into coupling engagement, the power transmitting path is placed in the power transmitting state. In contrast, uncoupling both the first and second clutches C1 and C2 places the power transmitting path in the power cutoff state.

With the automatic transmission portion 20, further, uncoupling an on-uncoupling side coupling device white coupling an on-coupling side coupling device allows a so-called "clutch-to-clutch" shifting action to be executed for respective gear positions to be selectively established. This allows a speed ratio γ (rotation speed NIB of the power transmitting member 18/rotation speed $N_{OUT}$ of the output shaft 22) equally varying i.e., geometrically varying for each gear position to be obtained. As indicated in the coupling operation table shown in FIG. 2, coupling the first clutch C1 and second brake B2 establishes 1st-speed gear position having a speed ratio γ1 of approximately, for instance, "2.804".

With the first clutch C1 and first brake B1 coupled in operation, a 2nd-speed gear position is established with a speed ratio γ2 of, for instance, approximately "1.531", which is lower a value of the speed ratio γ1. With the first clutch C1 and second clutch C2 coupled in operation, a 3rd-speed gear position is established with a speed ratio γ3 of, for instance, approximately "1.000", which is lower a value of the speed ratio γ2. Coupling the second clutch C2 and second brake B2 establishes a reverse-rive gear position (reverse-rive shift position) with a speed ratio γR of; for instance, approximately "2.393", which is intermediate between those of the 1st-speed gear position and the 2nd-speed gear position. In addition, uncoupling i.e., disengaging or releasing the first clutch C1, second clutch C2, first brake B1 and second brake 132 allows a neutral position N to be established. The coupling operation of the coupling device of the automatic transmission portion 20 in the 4th-speed gear position shown in the engagement operation table shown in FIG. 2 is the same as the 3rd-speed gear position.

The first clutch C1, second clutch C2, first brake B1 and second brake 132 (hereinafter collectively referred to as "clutch C" and "brake B", unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the transmission mechanism 10 of such a structure, the differential portion 11 serving as the continuously variable transmission, and the automatic transmission portion 20 constitute a continuously variable transmission. More particularly, the differential portion 11 functions as the continuously variable transmission and the automatic transmission portion 20 connected to the differential portion 11 in series functions as the step-variable transmission. Thus, the rotation speed, input to the automatic transmission portion 20 placed for at least one gear position M (hereinafter referred to as "input rotation speed of the automatic transmission portion 20"), i.e., the rotation speed of the power transmitting member 18 (hereinafter referred to as "transmitting-member rotation speed N18") is caused to continuously vary, thereby enabling the gear position M to have a continuously variable speed range i.e., width or spread.

Accordingly, the transmission mechanism 10 provides an overall i.e., total speed ratio γT (rotation speed $N_{IN}$ of the input shaft 14/rotation speed $N_{OUT}$ of the output shaft 22) in a continuously variable range. Thus, the continuously variable transmission is established in the transmission mechanism 10. The overall speed ratio γT of the transmission mechanism 10 is the total speed ratio γT of a whole of the automatic transmission portion 20 that is established based on the speed ratio γ0 of the differential portion 11 and the speed ratio γ of the automatic transmission portion 20.

For the respective gear positions such as, for instance, the 1st-speed to 3rd-speed gear positions and the reverse-drive gear position of the automatic transmission portion 20 as indicated in the coupling operation table shown in FIG. 2, the transmitting-member rotation speed N18 is continuously varied with each gear position being obtained in a continuously variable speed range. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 3rd-speed gear positions or the reverse rive gear position (reverse rive shift position) to be selectively established. This allows the overall speed ratio γT, variable in a nearly equal or geometrical ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 3rd-speed gear positions and the reverse-drive gear position of the automatic transmission portion 20 as indicated by the coupling operation table shown in FIG. 2. Further, if the automatic transmission portion 20 is controlled under the 3rd-speed gear position so as to cause the differential portion 11 to have the speed ratio 70 of approximately, for instance, "0.7" less than a value of "1", the automatic transmission portion 20 has the total speed ratio γT of approximately, for instance, "0.705" that is less than a value of the 4th-speed gear position.

FIG. 3 is a collinear chart for the transmission mechanism 10, including the differential portion 11 and the automatic transmission portion 20, wherein the relative motion relationships among the rotation speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26 and 28, and the ordinate axis plotted with the mutually relative rotating speeds of the rotary elements. Of three transverse lines, a lower transverse line X1 indicates the rotation speed that is zeroed; an upper transverse line X2 the rotation speed of "1.0", that is, the rotating speed of the engine connected to the input shaft 14; and a transverse line XG the rotation speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, four vertical lines Y4, Y5, Y6 and Y7 for the automatic transmission portion 20 represent the mutually relative rotating speeds of: the second and third sun gears S2, S3 connected to each other corresponding to a fourth rotary element (fourth element) RE4; the third carrier CA3 corresponding to a fifth rotary element (fifth element) RE5; the second carrier CA2 and third ring R3 connected to each other corresponding to a sixth rotary element (sixth element) RE6; and the second ring gear R2 corresponding to a seventh rotary element (seventh element) RE7, respectively. Each distance between the adjacent vertical lines is determined based on the gear ratios ρ2 and ρ3 of the second and third planetary gear sets 26 and 28.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1", and a space between the vertical lines Y2 and Y3 is set to a distance corresponding to the gear ratio ρ1. For the automatic transmission portion 20, further, the space between the sun gear and carrier is set to the distance corresponding to the value of "1" for each of the second and third planetary gear sets 26 and 28, for which the space between the carrier and ring gear is set to the distance corresponding to the gear ratio ρ.

Referring to the collinear chart of FIG. 3, the power distributing mechanism 16 (differential portion 11) of the transmission mechanism 10 of the present embodiment is arranged such that the first rotary element RE1 (first carrier CA1) of the first planetary gear set 24 is connected to the input shaft 14, i.e., the engine, and the second rotary element RE2 is connected to the first electric motor M1. The third rotary element RE3 (first ring gear R1) is connected to the power transmitting member 18 and the second electric motor M2. Thus, rotation of the input shaft 14 is transmitted (input) to the automatic transmission portion 20 through the power transmitting member 18. A relationship between the rotation speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other, while the rotation speed of the first ring gear R1 indicated at an intersecting point between the straight line L0 and the vertical line Y3 is bound with the vehicle speed and remains at a nearly constant level. In this case, as the engine speed $N_E$ is controlled with the rotation speed of the first carrier CA1, as represented by an intersecting point between the straight line L0 and the vertical line Y2, being raised or lowered, the rotation speed of the first sun gear S1, i.e., the rotation speed of the first electric motor M1, indicated by an intersecting pint between the straight line L0 and the vertical line Y1, is raised or lowered.

On controlling the rotation speed of the first electric motor M1 so as to allow the differential portion 11 to have the speed ratio γ0 of "1" with the first sun gear S1 rotating at the same speed as the engine speed $N_E$, the straight line L0 is aligned with the horizontal line X2. When this takes place, the first ring gear R1, i.e., the power transmitting member 18, is caused to rotate at the same speed as the engine speed. On the contrary, if the rotation speed of the first electric motor M1 is controlled so as to allow the differential portion 11 to have the speed ratio γ0 of a value less than "1", for instance, a value of approximately "0.7" with the rotation speed of the first sun gear S1 being zeroed, the power transmitting member 18 is caused to rotate at an increased transmitting-member rotation speed N18 higher than the engine rotation speed $N_E$.

In the automatic transmission portion 20, the fourth rotary element RE4 is selectively connected to the power transmitting member 18 via the second clutch C2 and selectively connected to the casing 12 via the first brake B1, with the fifth rotary element RE5 being selectively connected to the casing 12 via the second brake B2. The sixth rotary element RE6 is connected to the output shaft 22 of the automatic transmission portion 20, with the seventh rotary element RE7 is selectively connected to the power transmitting member 18 via the first clutch C1.

Next description is made of a case wherein with the automatic transmission portion 20, the differential portion 11 is placed in a state with the straight line L0 brought into coincidence with the horizontal line X2 to cause the differential portion 11 to transfer the vehicle drive force to the seventh rotary element RE7 at the same speed as the engine speed $N_E$ upon which the first clutch C1 and the second brake B2 are coupled as shown in FIG. 3. In this case, the rotation speed of the output shaft 22 for the 1st-speed gear position is represented by an intersecting point between the inclined line L1 passing across an intersecting point between the vertical line Y7 indicative of the rotation speed of the seventh rotary element RE7 (R2) and the horizontal line X2, and a point of intersection between the vertical line Y5 indicative of the rotation speed of the fifth rotary element RE5 (CA3) and the horizontal line X1, and an intersecting point intersecting the vertical line Y6 indicative of the rotation speed of the sixth rotary element RE6 (CA2, R3) connected to the output shaft 22 as indicated in FIG. 3.

Similarly, the rotation speed of the output shaft 22 for the 2nd-speed gear position is represented by an intersecting point between an inclined straight line L2, determined when the first clutch C1 and first brake B1 are coupled, and the vertical line Y6 indicative of the rotation speed of the sixth rotary element RE6 connected to the output shaft 22. The rotation speed of the output shaft 22 for the 3rd-speed gear position is represented by an intersecting point between a horizontal straight line L3 determined with the first clutch C1 and second clutch C2 being coupled and the vertical line Y6 indicative of the rotation speed of the sixth rotary element RE6 connected to the output shaft 22.

With the differential portion 11, if the straight line L0 takes a state shown in FIG. 3 with the differential portion 11 inputting drive power to the seventh rotary element RE7 at the rotation speed higher than the engine rotation speed, the rotation speed of the output shaft 22 for 4th-speed gear position is represented at an intersecting point between a horizontal straight line L4 determined with the first and second clutches C1, C2 being coupled, and a vertical line Y6 representing the rotation speed of the six rotary element RE6 connected to the output shaft 22.

Figure 4:
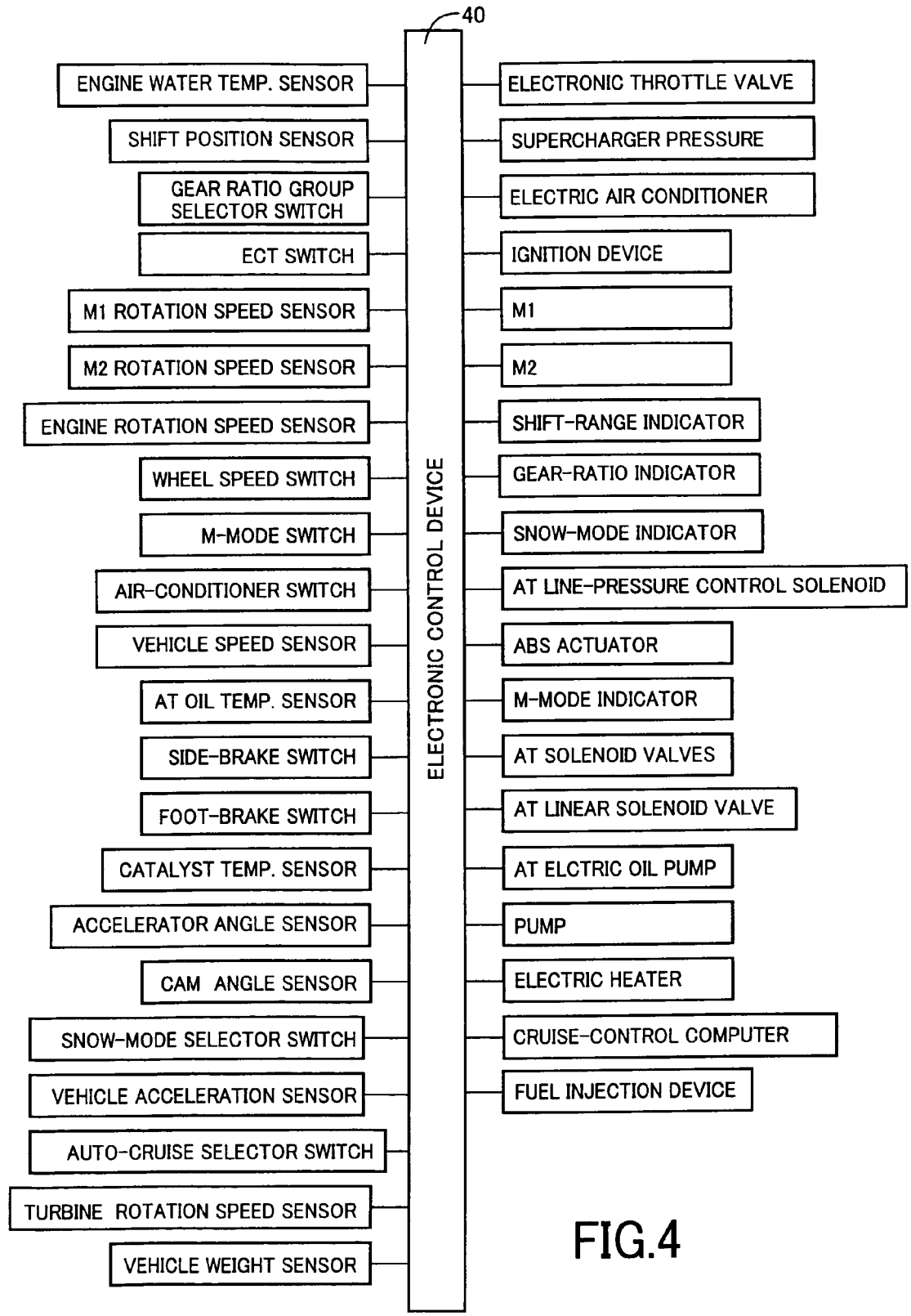
FIG. 4 is a view showing an electronic control unit with input and output signals associated therewith which is provided in the vehicular drive system for use in a hybrid vehicle shown in FIG. 1.

FIG. 4 shows an electronic control unit 40 operative to control the transmission mechanism 10 of the present invention for generating various output signals in response to various input signals. The electronic control unit 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine, and first and second electric motors M1 and M2, and drive controls such as shifting controls of the automatic transmission portion 20.

The electronic control unit 40, connected to various sensors and switches as shown in FIG. 4, receives various signals such as: a signal indicative of an engine coolant temperature; a signal indicative of a shift position; a signal indicative of open/close of a window, a signal indicative of a rotation speed $N_{M1}$ of the first electric motor M1; a signal indicative of a rotation speed $N_{M2}$ of the second electric motor M1; a signal indicative of the engine rotation speed; and a signal commanding an M mode (manual shift cunning mode).

The electronic control unit 40 also receives an air-conditioner signal indicative of operation of an air conditioner, a vehicle speed signal indicative of a vehicle speed; an oil temperature signal indicative of temperature of an operation oil of the automatic shifting portion 20; a signal indicative of a side brake under operation; a signal indicative of a foot brake under operation; a signal indicative of a temperature of a catalyst; a signal indicative of an accelerator opening; a signal indicative of a cam angle; a signal indicative of a snow mode under setting, a signal indicative a fore and aft acceleration value of the vehicle; a signal indicative of an auto-cruising drive mode; and a signal indicative of a vehicle weight.

The electronic control unit 84 generates various signals including: a drive signal applied to a throttle actuator to control a throttle valve opening of a throttle valve; a supercharger pressure regulation signal to regulate a supercharger pressure; a an electric air conditioner drive signal to drive an air conditioner, an ignition signal to control the ignition timing of the engine; command signals for commanding the operations of the first and second electric motors M1 and M2; a gear-ratio indicating signal for displaying the gear ratio; snow-mode display signal for displaying the presence of a snow-mode; and an ABS actuation signal for operating an ABS actuator to preclude slippages of the drive wheels during a braking phase.

The electronic control unit 40 also generates; an M-mode display signal for displaying an M-mode being selected; valve command signals for actuating electromagnetic valves (linear solenoid valves) incorporated in the hydraulic control unit 70 for controlling the hydraulic actuators of the hydraulically operated frictional coupling devices of the automatic transmission portion 20 and the power distribution mechanism 16; a drive command signal for actuating an electric hydraulic pump acting as a hydraulic original-pressure source of the hydraulic control unit to be regulated; a signal for driving an electric heater, and a signal applied to a cruise-control computer.

Figure 5:
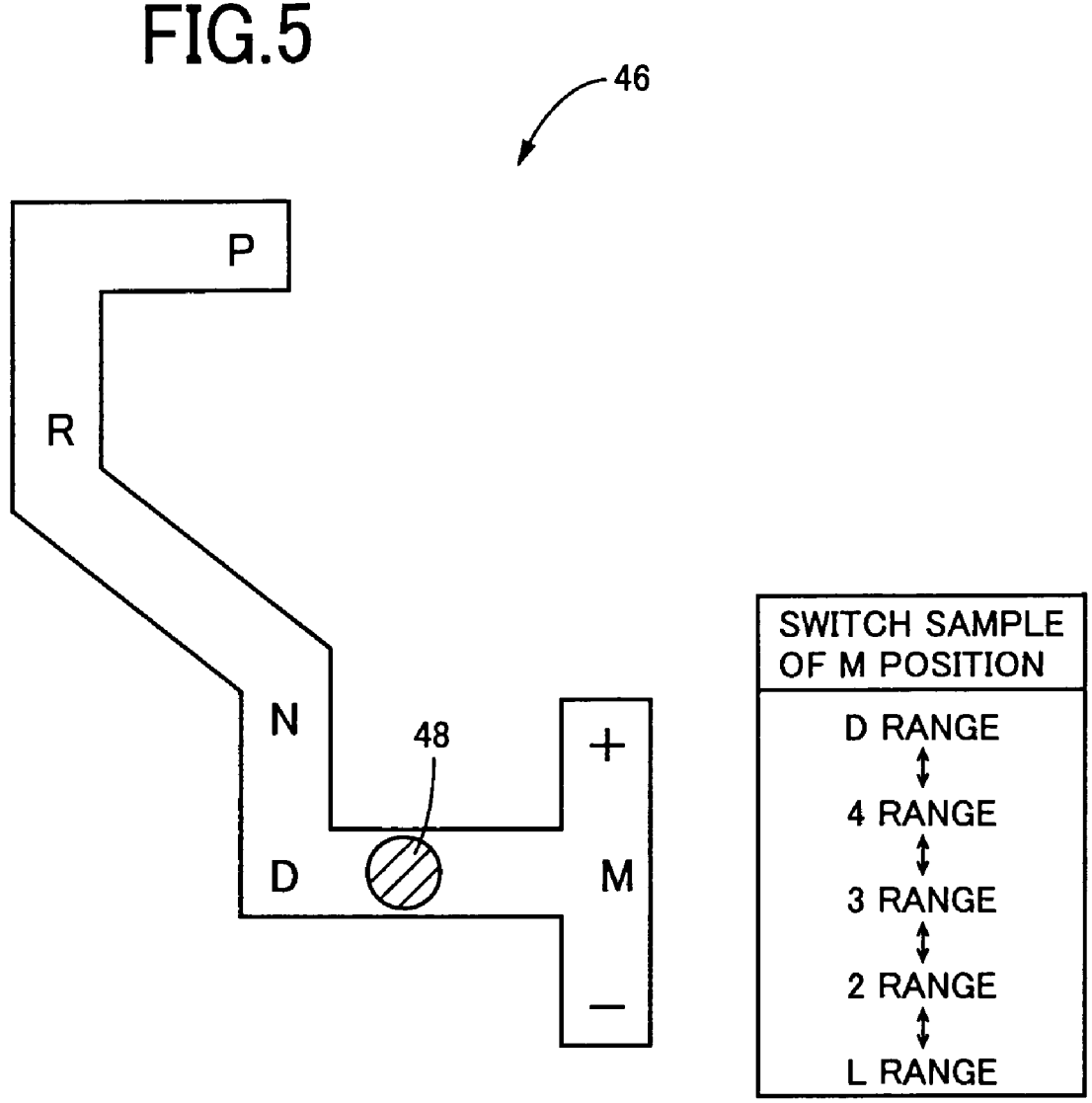
FIG. 5 is a view showing one example of a manually operated shifting device including a shift lever operable to select one of a plurality of shift positions.

FIG. 5 shows on sample of a shift operation device 46 which is one kind of the manual shift operation device to be switched by manual operation to one of plural kinds of shift positions. This shift operation device 46 includes a shift lever i.e., switch lever 48 disposed for example at lateral side of the driver's seat and manually operated to select one of plural kinds of shifting positions. This shift lever 48 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)".

In the "P (parking)", none of the engaging device such as the first clutch C1 and the second clutch C2 are not engaged, as shown in the engagement operation table of FIG. 2, to set the interrupt state of the power transmitting path in the shifting mechanism 10, that is the automatic shifting portion 20, and to lock rotation of the output shaft 22. In the "N (neutral)", the power transmitting path in the shifting mechanism 10 is interrupted.

Among the respective shift positions "P" to "M," the positions "P" and "N" are non-drive positions selected when the vehicle is caused not to run. The positions "R" "D" and "M" are the drive position selected when the vehicle is caused to run. The position "D" is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The shift lever 48 is operated to the "M" position, for manually selecting one of the above-indicated "D" through "L" positions. Specifically, for the "M" position, an upshift position "+" and a downshift position "−" are provided in the front-rear direction of the vehicle. The shift lever 48 is manipulated to the upshift position "+" and the downshift position "−" to select any of the "D" range to the "L" range.

For example, the five shifting ranges of the "D" range to the "L" range selected at the "M" position correspond to, in the changeable range of the overall speed ratio γT which can control the shifting mechanism 10 automatically, different kinds of shifting ranges in which the overall speed ratio γT at higher speed side (minimum gear ratio side) are different. Also, these five shifting ranges limit the shifting range i.e., scope of the shifting position (gear position) so that the maximum side shifting position which can control the shifting of the automatic shifting portion 20 is different.

The shift lever 48 is urged by urge means such as a spring from the upshift position "+" and the downshift position "−" to be automatically returned to the "M" position. In addition, the shift operation device 46 is provided with a shift position sensor (not shown) for detecting each of the shift positions of the shift lever 48. A signal representing the shift position of the shift lever 48, and the number of manipulation at the "M" position are outputted to the electronic control device 40.

Figure 6:
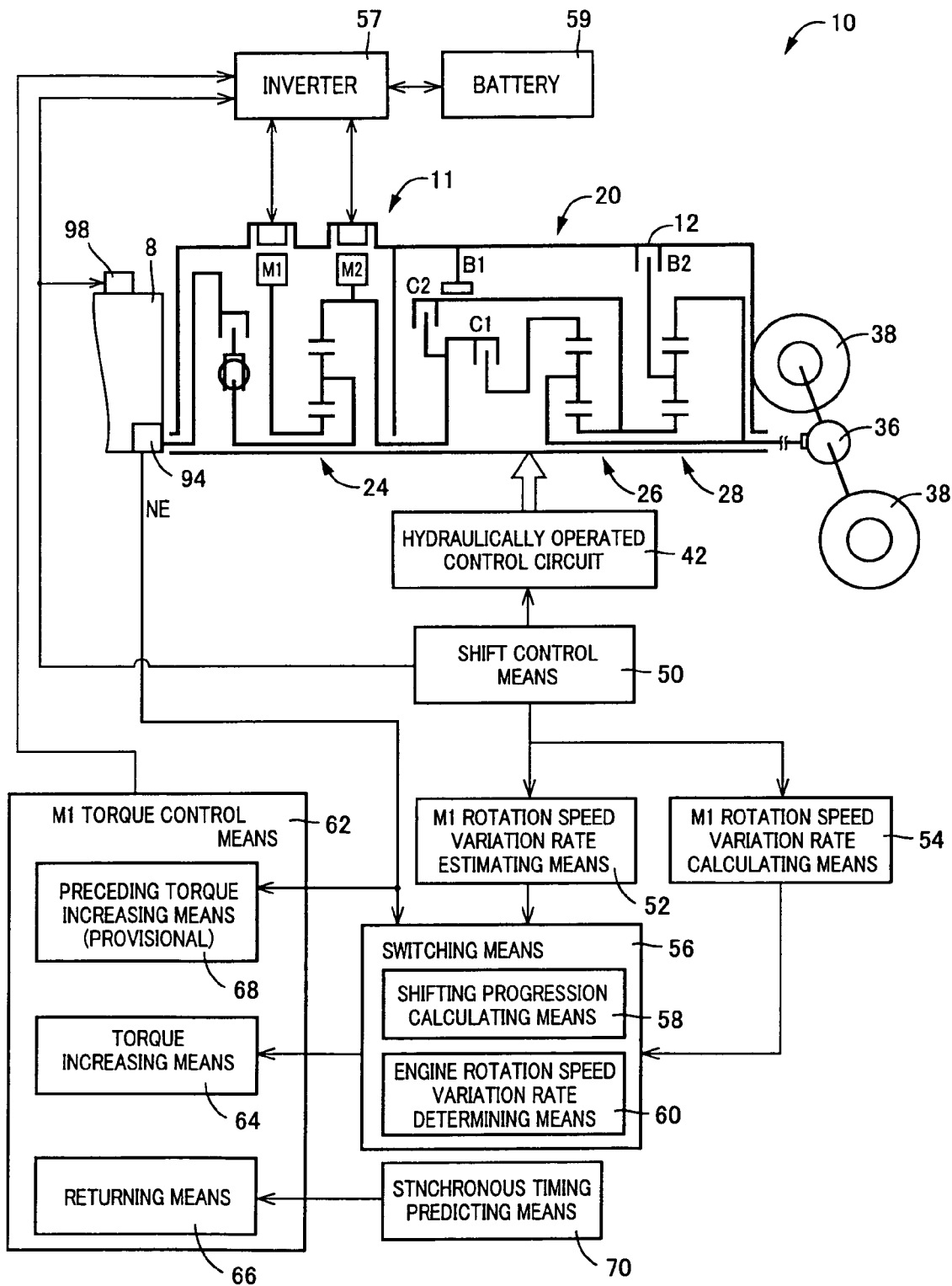
FIG. 6 is a functional diagram showing a main part of the electronic control device shown in FIG. 4.

FIG. 6 is a functional block diagram illustrating a basic sequence of essential control operations to be executed with the electronic control unit 40, i.e., a basic sequence of controls operations for executing torque control during a coast downshift. Shift control means 50 determines whether to execute the shifting in the step-variable shifting portion 20, that is, a gear position to be shifted in the step-variable shifting portion 20 based on the vehicle condition, represented by the vehicle speed V and demanded output torque $T_{OUT}$ of the step-variable shifting portion 20. Upon determination, shifting lines (relationship and a shifting map) indicated by, for instance, solid lines and single dot lines, shown in FIG. 7, which are prestored in storage means 56 is refereed. The step-variable shifting portion 20 executes the automatic shift control so as to obtain the gear position being determined. When this takes place, the shift control means 50 outputs a command (shifting output command) to the hydraulically operated control circuit 42 to cause the hydraulically operated frictional devices to be coupled and/or uncoupled so as to establish the gear position according to, for instance, the engagement operation table shown in FIG. 2.

The shift control means 50 functions as continuously variable shift control means. With the shifting mechanism 10 placed in the continuously variable shifting state, that is, with the continuously variable shifting portion 11 placed in the differential state, the engine 8 is caused to operate in an operating range with high efficiency. Further, the shift control means 50 allows the drive forces to be distributed from the engine 8 and the second electric motor M2 at an optimal ratio while optimizing a reaction force generated by the first electric motor M1. This allows the continuously variable shifting portion 11 to act as an electrically controlled continuously variable transmission for providing a controlled speed ratio γ0.

For the vehicle running at a given speed at that time, the shift control means 50 calculates a target (demanded) output of the vehicle based on, for instance, the accelerator pedal displacement value Acc and the vehicle speed V representing a driver's demand output value, while calculating a demanded total target output based on the target output of the vehicle and a demanded battery charge value. Then, the shift control means 50 calculates a target engine output so as to obtain the resulting total target output in consideration of a loss in power transmission, a load of an auxiliary unit and assist torque, etc., of the second electric motor M2. This allows the engine 8 to be controlled to provide the engine rotation speed NE and engine torque TE so as to obtain the relevant target engine output while controlling a rate of electric power being generated by the first electric motor M1.

The shift control means 50 executes the control in consideration of the gear position of the step-variable shifting portion 20 for the purpose of improving power performance and fuel consumption. When this takes place, the continuously variable shifting portion 11 is caused to function as the electrically controlled continuously variable transmission such that the engine rotation speed NE, determined for the engine 8 to operate in the operating range with high efficiency, is caused to interface with the rotation speed of the power transmitting member 18 determined with the vehicle speed V and the gear position of the step-variable shifting portion 20.

Figure 9:
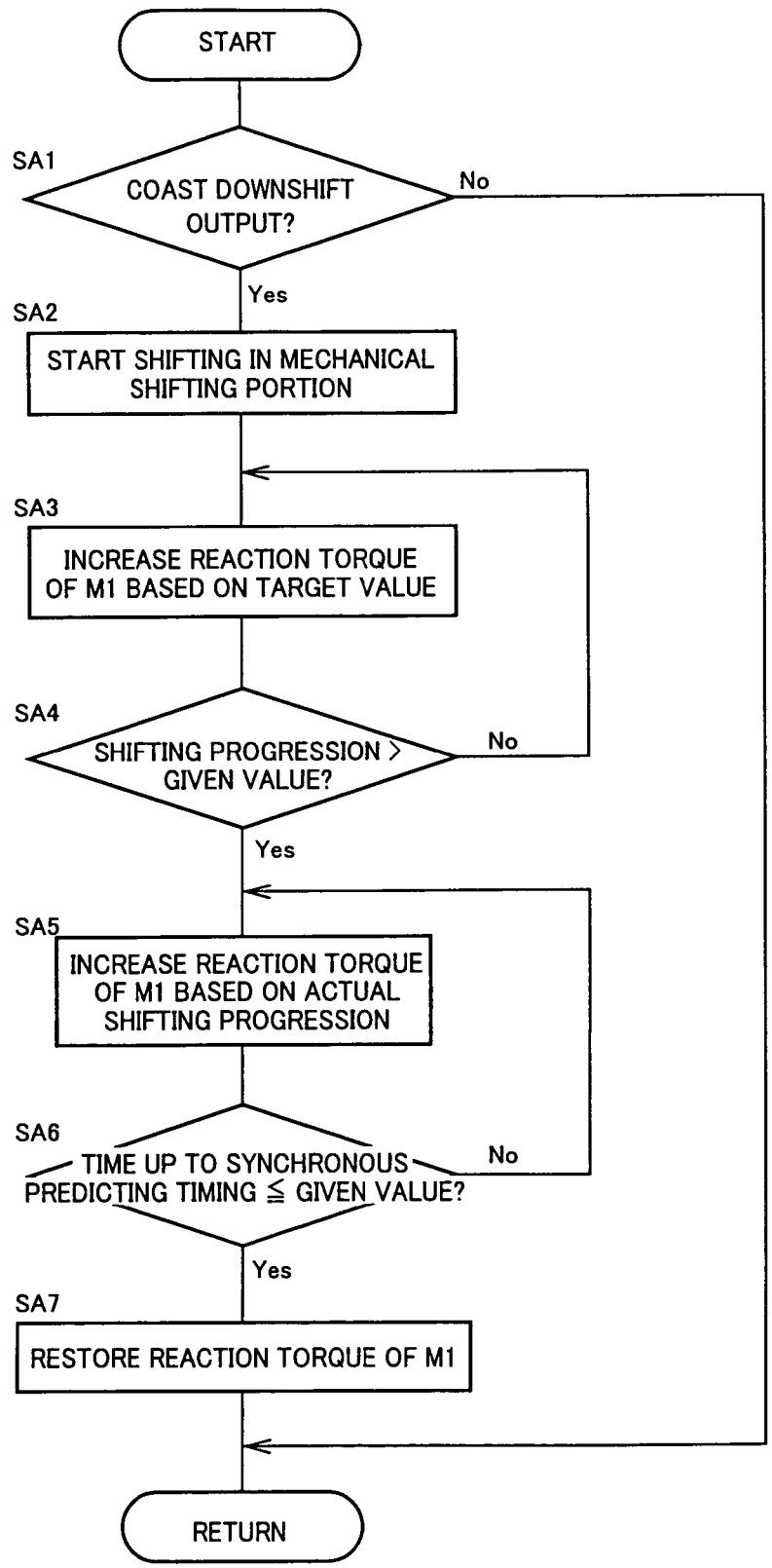
FIG. 9 is a flowchart illustrating a basic sequence of control operations to be executed with the electronic control unit shown in FIG. 6, i.e., a basic sequence of torque control operations of a first electric motor when performing a shifting control of the step-variable shifting portion.

That is, the shift control means 50 determines a target value of the total speed ratio γT of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and stored in advance. This achieves a compromise between drivability and fuel consumption during the running of the vehicle under a continuously variable shifting mode on a two-dimensional coordinate established with the engine speed NE and output torque (engine torque) $T_E$ of the engine 8. For instance, the target value of the total speed ratio γT of the transmission mechanism 10 is determined so as to obtain engine torque $T_E$ and the engine speed $N_E$ for generating the engine output demanded for satisfying target outputs (a total target output and demanded drive torque). Then, the speed ratio γ0 of the step-variable shifting portion 11 is controlled in consideration of the gear position in the continuously variable shifting portion 20 so as to obtain the relevant target value, thereby controlling the total speed ratio γT within a continuously variable shifting range, for example 13 to 0.5.

When this takes place, the shift control means 50 allows electric energy, generated by the first electric motor M1, to be supplied through an inverter 57 to a battery 59 and the second electric motor M2. Thus, a major part of the drive power delivered from the engine 8 is mechanically transferred to the power transmitting member 18. A part of the drive power of the engine 8 is consumed with the first electric motor M1 for the generation of electric power, which in turn is converted into electric energy. Resulting electric energy is supplied through the inverter 57 into the second electric motor M2, which is consequently driven to generate a drive force. Thus, the part of the drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power delivered from the engine 8 is converted into electric energy that is converted into mechanical energy.

Especially, with the step-variable shifting portion 20 executed the shifting control the step-variable shifting portion 20 varies a speed ratio step-by-step accompanied by a stepwise variation in an overall speed ratio γT of the shifting mechanism 10 on a stage before and after the shifting. The overall speed ratio γT varies stepwise, that is, the speed ratio discretely varies in a discontinuous manner, thereby making it possible to immediately vary drive torque in contrast to a continuous variation in the overall speed ratio γT. On the contrary, a shifting shock tends to occur with a difficulty of controlling the engine rotation speed so as to trace an optimum fuel consumption curve with resultant deterioration in fuel consumption.

In order to suppress the stepwise variation in the overall speed ratio γT, the shift control means 50 compels the continuously variable shifting portion 11 to execute the shifting in synchronism with the shifting of the step-variable shifting portion 20 such that the speed ratio varies in a direction opposite to that in which the speed ratio is varied with the step-variable shifting portion 20.

In other words, the shift control means 50 executes the shifting control of the continuously variable shifting portion 11 in synchronism with the shifting control of the step-variable shifting portion 20 so as to continuously vary the overall speed ratio γT of the shifting mechanism 10 on a stage before and after the shifting of the step-variable shifting portion 20. The shifting mechanism 10 has no transient variation in the overall speed ratio γT on the stage before and after the shifting of the step-variable shifting portion 20. Thus, for instance, the shift control means 50 executes the shifting control of the continuously variable shifting portion 11 in synchronism with the shifting control of the step-variable shifting portion 20 so as to vary the speed ratio stepwise in a direction opposite to that of a stepwise variation in the speed ratio of the step-variable shifting portion 20 by a variation or part corresponding to the stepwise variation in the speed ratio of the step-variable shifting portion 20.

Figure 8:
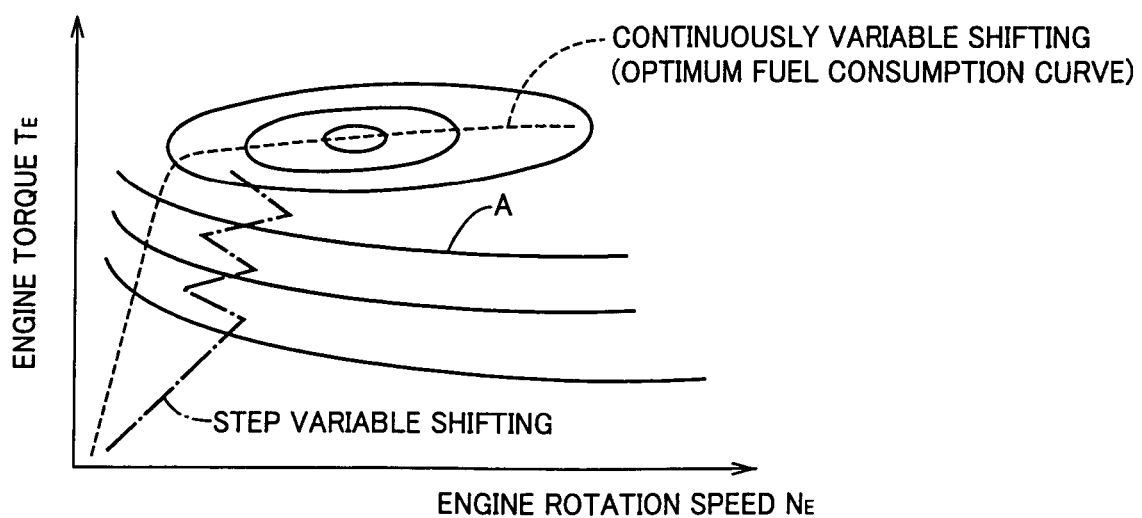
FIG. 8 is a view showing one example of a fuel consumption map representing an optimal fuel consumption curve of an engine 6.

From another point of view, in general, a step-variable type automatic transmission allows the engine 8 to operate along a single dot line shown in FIG. 8 whereas with the continuously variable transmission, the engine 6 is caused to operate along an optimal fuel consumption curve indicated by a broken line in FIG. 8 or to operate on a pattern closer to the optimal fuel consumption curve than that of a fuel consumption curve of the engine 8 caused to operate with the step-variable type automatic transmission. Accordingly, when making comparison between the continuously variable transmission and the step-variable type automatic transmission, the continuously variable transmission allows engine torque TE, available to obtain demanded drive torque (vehicle drive force), to be realized at the engine rotation speed NE on a pattern closer to the optimal fuel consumption curve than that realized with the step-variable type automatic transmission.

Thus, the continuously variable transmission is regarded to be advisable to provide further improved fuel consumption than that obtained by the step-variable type automatic transmission. In order to prevent deterioration in fuel consumption even if the step-variable type automatic transmission executes the shifting to vary the speed ratio step-by-step, the shift control means 50 controls a speed ratio γ0 of the continuously variable shifting portion 11 so as to cause the engine 8 to operate along the optimal fuel consumption curve indicated by, for instance, the broken line in FIG. 8.

The shift control means 50 allows a throttle actuator to controllably open or close an electronic throttle valve 98 for performing throttle control. In addition, the shift control means 50 functionally includes engine output control means that outputs commands singly or in combination to allow a fuel injection device (not shown) to control a filet injection quantity and a fuel injection timing for performing fuel injection control while allowing the engine 8 to execute output control so as to provide a demanded engine output. For instance, the shift control means 50 fundamentally operates to drive the throttle actuator in response to the accelerator opening signal Acc by referring to the prestored relationship (not shown) to execute throttle control such that the larger the throttle opening Acc, the greater will be the throttle opening θTH.

The shift control means 50 enables the vehicle to run on the motor drive mode due to the electrically controlled CVT function of the continuously variable shifting portion 11, regardless of the engine 8 being halted or remaining under an idling condition. For instance, a solid line A in FIG. 8 represents a boundary line between an engine drive region and a motor drive region based on which the drive power source for the vehicle to initiate a startup/run (hereinafter referred to as "for running") is switched between the engine 8 and the electric motor such as the second electric motor M2. In other words, the solid line A represents the boundary line for switching the so-called engine drive mode, in which the engine 8 is caused to act as the running drive-power source to start up or run (hereinafter referred to as "run") the vehicle, and a so-called motor drive mode in which the second electric motor M2 is caused to act for the running to run the vehicle.

The prestored relationship, having the boundary line (in solid line A) for switching between the engine drive mode and the motor drive mode shown in FIG. 8, represents one example of a drive-power source switching diagram (drive-power source map) formed in a two-dimensional coordinate in terms of parameters including the vehicle speed V and output torque TOUT representing a drive-power source relevant value. The drive-power source switching diagram is prestored in, for instance, the storage means together with the shifting lines (shifting map) plotted in the solid lines and the single dot line shown in FIG. 8.

The shift control means 50 determines which of the motor drive region and the engine drive region is involved based on the vehicle condition, represented by the vehicle speed V and demanded output torque TOUT, by referring to, for instance, the drive-power source switching diagram shown in FIG. 8, thereby executing either the motor drive mode or the engine drive mode. As will be apparent from FIG. 8, the shift control means 50 executes the motor drive mode under a relatively low output torque TOUT region, i.e., a low engine torque TE region, or a relatively low vehicle speed range of the vehicle speed V, i.e., at a low load region in which, in general, an engine efficiency is regarded to be lower than that when the engine 8 is operating in a high torque range.

Therefore, in normal practice, a motor startup is executed in priority to start up the engine. In contrast, depending on the vehicle condition where the accelerator pedal is deeply depressed during the startup of the vehicle such that demanded output torque TOUT, i.e., demanded engine torque TE, exceeds the motor drive region in the drive-power source switching diagram shown in FIG. 8, the engine startup is executed.

Even if the vehicle lies in the engine drive region, the shift control means 50 allows the second electric motor M1 to be supplied with electric energy from the first electric motor M1 and/or electric energy from the battery 59 through the electric path set forth above. Driving the second electric motor M2 to apply torque to the drive wheels 38 makes it possible to provide a so-called torque assist for assisting the drive power of the engine 8. Therefore, the engine drive mode of the present invention is supposed to include a pattern "engine drive mode plus motor drive mode".

The shift control means 50 allows the engine 8 to be maintained in the operating state due to the electrically controlled CVT function of the continuously variable shifting portion 11 regardless of the vehicle held in the halted state or remaining under the low vehicle speed condition. For instance, under a circumstance where during a halt of the vehicle, a drop occurs in a state of charge SOC of the battery 59 to cause a need to arise for the first electric motor M1 to generate electric power, the drive power of the engine 8 is applied to the first electric motor M1 to generate electric power while raising the rotation speed of the first electric motor M1. Even if the second electric-motor rotation speed NM2, uniquely determined with the vehicle speed V, is zeroed due to a halted condition of the vehicle, the engine rotation speed NE is maintained at a value higher than an autonomously rotatable speed due to the differential action of the continuously variable shifting portion 11.

The shift control means 50 controls the first electric-motor rotation speed NM1 and/or second electric-motor rotation speed NM2 due to the electrically controlled CVT friction of the continuously variable shifting portion 11 regardless of the vehicle held in the halted state or remaining under the low vehicle speed condition for thereby maintaining the engine rotation speed NE at a fixed level or rotatably controlling the same at an arbitrary value. In other words, the shift control means 50 maintains the engine rotation speed NE at the fixed level or controls the same at the arbitrary value while rotatably controlling the first electric-motor rotation speed NM1 and/or second electric-motor rotation speed NM2 at arbitrary rotation speeds. For instance, as will be apparent from the collinear chart shown in FIG. 3, when raising the engine rotation speed NE during the running of the vehicle, the shift control means 50 executes the raising of the first electric-motor rotation speed NM1 wile maintaining the second electric-motor rotation speed NM2, bound with the vehicle speed V (drive wheels), at a nearly fixed level.

Under a circumstance where the shift control means 50 determines the presence of the shifting accompanied by a downshift of the step-variable shifting portion 20, M1 rotation speed variation rate estimating means 52 calculates a rotation speed variation rate estimated value $\Delta NM1p$ of the first electric motor M1. More particularly, the rotation speed variation rate estimated value $\Delta NM1p$ of the first electric motor M1 is calculated based on a target engine rotation speed NEtgt subsequent to the initiation of the downshift, a rotation speed NM2b of the second electric motor M2 immediately before the initiation of the downshift and an estimated value NM2a on the rotation speed of the second electric motor M2 subsequent to the initiation of the downshift as expressed by a formula:

$$\Delta NM1p = ((1/\rho 1) \times NM2a - ((1+\rho 1)/\rho 1) \times NEtgt) - ((1/\rho 1) \times NM2b - (1+\rho 1)/\rho 1 \times NEtgt) \quad (1)$$

The above formula is premised on the following. First, the rotation speed NM1 of the first electric motor M1, the rotation speed NM2 of the second electric motor M2 and the engine rotation speed NE have the relationship expressed by a formula (2) using a gear ratio $\rho 1$ based on a bounding condition of the first planetary gear set 24. Second, almost no variation takes place in the engine rotation speed NE on a stage before and after the shifting with the time required for the shifting laying in an extremely short period of time. That is, the target engine rotation speed NEtgt subsequent to the shifting is equal to the engine rotation speed before the shifting being initiated.

$$NM1 = (1/\rho 1) \times NM2 - ((1+\rho 1)/\rho 1) \times NE \quad (2)$$

Further, in calculating the rotation speed variation rate of the first electric motor M1, the M1 rotation speed variation rate estimating means 52 employs an estimated value NM2a of the rotation speed of the second electric motor M2 subsequent to the shifting. Thus, the first electric-motor rotation speed variation rate resulting from such calculation represents an estimated value. In addition, an actual rotation speed of the second electric motor M2 is detected by, for instance, a resolver (not shown) mounted in an area close proximity to the electric motor.

Under a circumstance where the shift control means 50 determines the presence of the shifting accompanied by the downshift of the step-variable shifting portion 20, first electric motor (M1) rotation speed variation rate calculating means 54 calculates a rotation speed variation rate $\Delta NM1$ of the fast electric motor M1. More particularly, by using the target engine rotation speed NEtgt subsequent to the downshift the actual rotation speed NM2 of the second electric motor M2 at a current time, and another actual rotation speed NM2 ($t-\Delta t2$) of the second electric motor M2 on timing earlier than the current time by a minimal time $\Delta t2$, a rotation speed variation rate $\Delta NM1$ of the first electric motor M1 is calculated in a formula (3) as expressed as:

$$\Delta NM1 = ((1/\rho 1) \times NM2(t-\Delta t2) - ((1+\rho 1)/\rho 1) \times NEtgt) - ((1/\rho 1) \times NM2(t) - ((1+\rho 1)/\rho 1 \times NEtgt) \quad (3)$$

Further, like the M1 rotation speed variation rate estimating means 52, even the M1 rotation speed variation rate calculating means 54 is based on the premise that almost no variation takes place in the engine rotation speed NE on the stage before and after the shifting, that is, the target engine rotation speed NEtgt subsequent to the shifting is nearly equal to the engine rotation speed before the shifting.

During the operation of first electric motor (M1) torque control means 62 (described below) to calculate torque applied to the first electric motor M1 by torque increasing means 64, switching means 56 performs the switching to select either the estimated value $\Delta NM1p$, estimated by the M1 rotation speed variation rate estimating means 52, or the value $\Delta NM1$ calculated by the M1 rotation speed variation rate calculating means 54.

More particularly, during the downshift executed by the shift control means 50, shifting progression calculating means 58 switches the estimated value $\Delta NM1p$ and the calculated value $\Delta NM1$ on the ground of a progression degree C (%) approaching a given progression degree C0 for calculating torque applied to the first electric motor M1. Here, the word "given progression degree Co" refers to a value, obtained on a preliminary experiment test or calculated on a simulation, which represents a value suited for the switching means to perform the switching.

The shifting progression calculating means 58 calculates the progression degree C (%) in the downshift executed by the shift control means 50, while determining whether or not the progression degree has reached a predetermined given progression degree C0. In particular, for instance, by referring to the relationship among a rotation speed N18b of the power transmitting member 18 which functions as an input shaft for the automatic shifting portion 20 immediately before the shift control means 50 executes the downshift the rotation speed N18a of the power transmitting member 18 of the automatic shifting portion 20 at timing when the downshift is completed, and a current rotation speed N18n of the power transmitting member 18 of the automatic shifting portion 20 in the course of the shifting being executed, the calculation is executed in, for instance, a formula (4) expressed below:

$$C(\%) = (N18n - N18b)/(N18a - N18b) \times 100 \quad (4)$$

Here, with the power transmitting member 18 connected to the second electric motor M2, the rotation speed N18 is equal to the rotation speed NM2 of the second electric motor M2. Accordingly, it may suffice to use the rotation speed NM2 of the second electric motor M2 that is detected with, for instance, the resolver (not shown) provided on the second electric motor M2. In this case, with the formula (4) set forth above, the relationships stands for N18$a$=NM2$a$ and N18$b$=NM2$b$.

First electric motor torque control means 62, including torque increasing means 64 and returning means 66, commands, for instance, the inverter 57 to cause an operating state of the first electric motor M1 to be altered such that the first electric motor M1 outputs torque TM1 at an altered power rate. Of such operation, the torque increasing means 64 calculates an increment ΔTM1 (Nm) of torque output by the first electric motor M1 as a result of which the torque increasing means 64 outputs a command to the inverter 57 so as to allow the first electric motor M1 to output torque TM1. The torque increment ΔTM1 is calculated in a formula (5) expressed as:

$$\Delta TM1 = IM1 \times \Delta NM1/\Delta t1 \qquad (5)$$

Here, "IM1 (kg·m$^2$)" represents moment of inertia, which represents a value to be calculated on a design. In addition, "Δt1" represents a target shifting time, indicative of a time starting from timing when the shift control means 50 determines the shifting to be executed to timing at which the shifting is actually completed, which is preliminarily set by a designer.

In this moment, setting the target shifting time Δt1 to a shortened value enables an increase in the rotation speed variation rate ΔNM1 of the first electric motor M1, resulting in an increase in the torque increment ΔTM1. This suppresses a response delay in variation of the rotation speed of the first electric motor M1 at the beginning of the downshift mentioned above.

The returning means 66 commands the inverter 57 so as to allow torque TM1, output by the first electric motor M1 at a magnitude incremented by the torque increment ΔTM1 by the torque increasing means 64, to be aligned with torque TM1$a$ for a running state subsequent to the downshift being executed. That is, this allows the first electric motor M1 to be restored from the state in which torque is raised. Here, torque TM1$a$, indicative of generated torque under the operating state of the first electric motor M1 during the running of the vehicle under a shifting state after the downshift has been completed, is predicted based on the accelerator opening Acc, the throttle opening θTH and the vehicle speed V before the shifting being executed or during the execution of the shifting.

Synchronous timing predicting means 70 predicts a time "tf", at which the downshift under execution is synchronized, i.e., when the downshift is completed, based on a variation speed dN18$n$/dt of the actual rotation speed N18$n$ of the power transmitting member 18 of the automatic shifting portion 20 at a current time, while determining whether or not a time interval, elapsed up to a predicted synchronizing time "tf", becomes less than a given time interval "tr". More particularly, the relationship among the variation speed dN18$n$/dt of the actual rotation speed N18$n$ of the power transmitting member 18 and the predicted rotation speed 18$a$ thereof during the shifting being completed of the automatic shifting portion 20, and a time required for the shifting to be terminated in such a case is obtained on a preliminary experiment and calculated on simulation for storage in a map. Then, the operation is executed using the map to predict the time, required for the relevant shifting to be terminated, which corresponds to the rotation speed N18$a$ during termination of the shifting predicted as the variation speed dN18$n$/dt of the actual rotation speed N18$n$ of the power transmitting member 18 at the current time.

When the prediction is executed on a computer, by using the rotation speed N18N(t) at a certain time (t) in actual practice and the rotation speed N18$n$ (t−Δt) in the past elapsed by a minimal time Δt than the time t, the variation speed dN18$n$/dt of the actual rotation speed N18$n$ of the power transmitting member 18 is calculated by a formula (6) expressed as:

$$dN18n/dt = (dN18n(t) - N18n(t - \Delta t))/\Delta t \qquad (6)$$

Further, the given time "tr", decided in consideration of a response delay of the first electric motor, is equal to or nearly equal to a time required for the returning means 66 to command the first electric motor M1 so as to allow the same to generate output torque at TM1$a$ and such torque to be actually output. Such a time is obtained on a preliminary experiment or calculated on a simulation.

Figure 10:
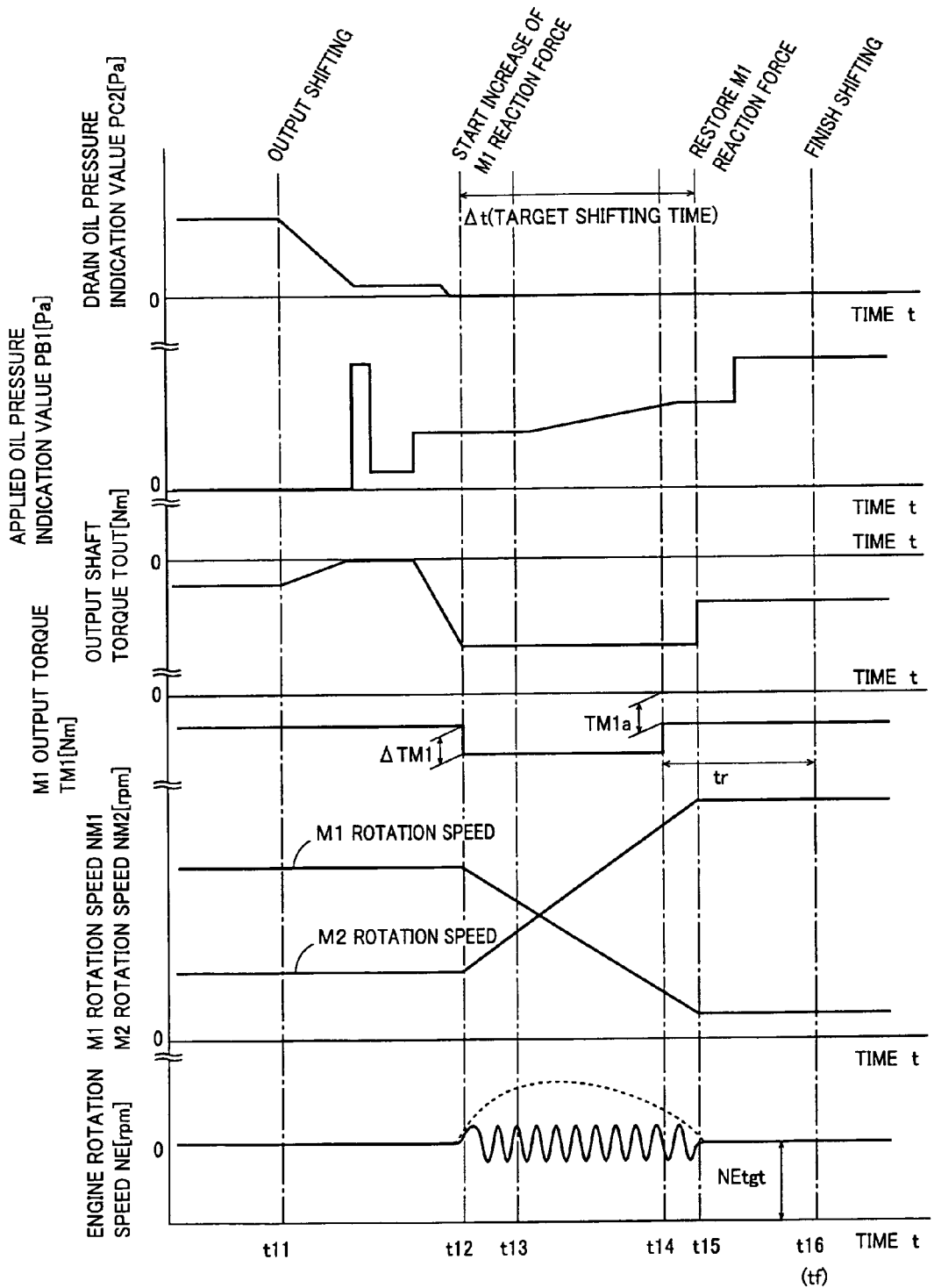
FIG. 10 is a timing chart illustrating the control operations shown in FIG. 9, which is a view representing the control operations to be executed when a coast downshift 3rd→2nd is executed in the step-variable shifting portion with the shifting mechanism placed in a continuously variable shifting state.

FIG. 9 is a flowchart illustrating an essence of control operations to be executed by the electronic control unit 40, i.e., a basic sequence of performing torque control operations of the first electric motor M1 when executing a downshift. This basic sequence is repeatedly executed on an extremely short cycle lime in the order of, for instance, several milliseconds to several tens milliseconds. FIG. 10 is a timing chart illustrating the control operations and shows the control operations to be executed in a case where with the shifting mechanism 10 placed in the continuously variable shifting state, the step-variable shifting portion 20 executes the upshift in a 3rd→2nd speed ratio.

Figure 7:
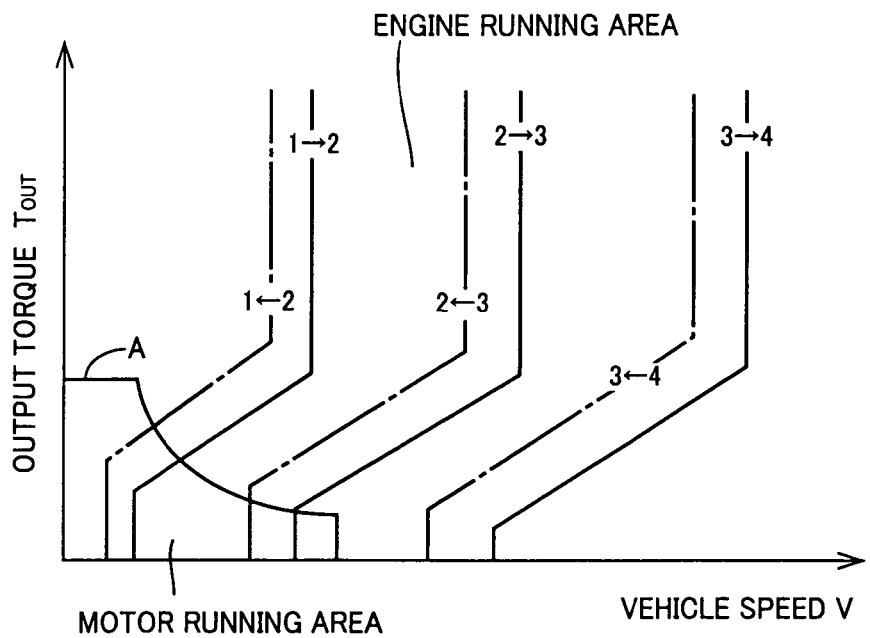
FIG. 7 is a view examples plotted on a two-dimensional coordinate plotted in terms of parameters including a vehicle speed and output torque. It shows one example of prestored shifting lines which serves as a base for determining a shifting in the step-variable shifting portion, one example of a prestored shifting diagram which serves as a base for determining a shifting state in a shifting mechanism, and one example of a prestored drive-power source switching diagram having a boundary line between an engine drive region and a motor drive region for an engine drive mode and a motor drive mode to be switched. Relation among these examples is also shown.

First in step (hereinafter, the word "step" is abbreviated) SA1 corresponding to the shift control means 50, the determination is made whether to execute the shifting by referring to, for instance, the shifting lines shown in FIG. 7 based on the vehicle speed V and output torque TOUT of the output shaft 22 of the automatic transmission. If the determination is made in the current step that the coast downshift is to be executed, then, the determination on the current step is made positive upon which operations subsequent to S2 are executed. Meanwhile, if no determination is made that the shifting is to be executed or if the determination is made that the shifting excepting the coast downshift is to be executed, the current flowchart is terminated once. Time t11 in FIG. 10 represents the determination being made that the coast downshift is to be executed in the step-variable shifting portion 20 from the 3rd-speed to 2nd-speed gear position.

Likewise, in SA2, corresponding to the shift control means 50, among the hydraulically operated frictional coupling devices of the step-variable shifting portion 20, the relevant hydraulically operated coupling devices associated with the relevant shifting are switched in coupling or uncoupling states with the hydraulically operated control circuit 42 for the purpose of executing the shifting determined to be executed in SA1. In performing a shift in the step-variable shifting portion 20 during a time interval from time t11 to time t12 in FIG. 10, a drain oil pressure, remaining at a hydraulic oil pressure PC2, of the clutch C2 (see FIG. 2) representing a coupling element being uncoupled, is decreased. On the contrary, an apply hydraulic pressure, remaining at a hydraulic oil pressure PB1 for the brake B1 representing the coupling element being coupled is caused to increase from time t11.

In SA3 corresponding to the M1 rotation speed variation rate estimating means 52 and the torque increasing means 64, first, by using the target engine rotation speed NEtgt subsequent to the initiation of the downshift, the rotation speed NM2b of the second electric motor M2 immediately before the initiation of the downshift and the estimated value NM2a on the rotation speed of the second electric motor M2 subsequent to the initiation of the downshift, the rotation speed variation rate ΔNM1p of the first electric motor M1 is calculated. Subsequently, the increment ΔTM1 of torque output by the first electric motor M1 is calculated based on the rotation speed variation rate estimated value ΔNM1p of the first electric motor M1, the inertia moment IM1 of the first electric motor M1 and the target shifting time Δt1. As a result, the first electric motor M1 provides torque TM1 (that is, output torque of the first electric motor M1 prior to the shifting is added with the increment ΔTM1) that needs to be output.

At time t12 in FIG. 10, reaction torque is increased by a value of ΔTM1. Here, with attention focused on the engine rotation speed NE, it is turned out that as torque of the first electric motor M1 is raised at a higher rate greater than a varying rate of the engine rotation speed with no control, as indicated by a broken line, being implemented, a drag in rotation of the engine caused by the occurrence of inertia torque is suppressed for thereby minimizing a variation range of the engine rotation speed NE.

In SA4 corresponding to the switching means 56 and shifting progression calculating means 58, the operation is executed to calculate the progression degree C, representing a degree of progression in the shifting, based on the rotation speed N18b of the power transmitting member 18 of the automatic shifting portion 20 on the stage immediately before the shifting, the rotation speed N18a of the power transmitting member 18 on the stage of the completion in downshift and the current rotation speed N18a of the power transmitting member 18 in the course of the shifting being executed.

Meanwhile, the operation is executed to determine whether or not the progression degree C reaches the predetermined given progression degree C0. If the calculated progression C in the shifting exceeds the given progression degree C0, the determination in the current step is made positive, after which the operations subsequent to SA5 will be executed. In addition, during the operation on a stage before SA4 being executed, the operation is executed to perform torque control (in SA3) of the first electric motor M1 based on the M1 rotation speed variation rate estimating means 52.

Further, after the determination in SA4 is made positive, torque control (in SA5) of the first electric motor M1 is executed based on the M1 rotation speed variation rate calculating means 54. Thus, if the determination in the current step is made positive, it can be said that these switching steps are carried out. Such switching steps are conducted because of preventing an adverse affect such as an affect of the response delay if the M1 rotation speed variation rate calculating means 54 executes torque increase using the first electric-motor rotation speed immediately after the execution of the shifting is commenced. In contrast, if the calculated progression C in the shifting does no exceed the given progression degree C0, the determination in the current step is made negative, after which the operations returns to SA3 and the operations in SA3 and SA4 are repeatedly executed until the determination in the current step is made positive, that is, until the shifting exceeds the progression degree C0. In FIG. 10, the determination in SA4 is made positive at time t13.

In SA5 corresponding to the M1 rotation speed variation rate calculating means 54 and torque increasing means 64, first, by using the target engine rotation speed NEtgt subsequent to the downshift, the actual rotation speed NM2(t) of the second electric motor M2 at the current time, and the actual rotation speed NM2(t−Δt) of the second electric motor M2 on a stage earlier than the current time by a given minimal time Δt2, the rotation variation rate ΔNM1 of the first electric motor M1 is calculated. Subsequently, the increment ΔTM1 of torque output by the first electric motor M1 is calculated based on inertia moment IM1 of the first electric motor M1 and the target shifting time Δt1. As a result, the first electric motor M1 outputs torque TM1 (i.e., output torque of the second electric motor M2 before the shifting added with the increment ΔTM1). In FIG. 10, reaction torque is increased by ΔTM1 at time t13.

In SA6 corresponding to the synchronous timing predicting means 70, a time "tf" for the downshift to be executed is predicted. The prediction is made by referring to the preliminarily obtained variation rate dN18n/dt of the actual rotation speed N18n of the power transmitting member 18 of the shifting portion 20, the predicted rotation speed N18a on a stage when the shifting is completed, and a time required for the shifting being completed based on a variation rate dN18n/dt of an actual rotation speed N18n of the power transmitting member 18 of the automatic shifting portion 20. Also, whether or not the time up to the predicted synchronizing time "tf" becomes less than a given time "tr" is determined.

In SA7 corresponding to the returning means 66, the inverter 57 is commanded to allow the first electric motor M1 to output torque TM1 with the increment ΔTM1 in SA3 and SA5 such that output torque lies at torque TM1a for the running state after the downshift is executed. In FIG. 10, the determination in SA 6 is made positive and output torque of the first electric motor M1 is caused to lie at TM1a at time t14.

In the illustrated embodiment 1, the electronic control unit 40, serving as a control device for a vehicular drive system, controls output torque TM1 of the first electric motor M1 in a manner described below. That is, during the downshift executed by the step-variable shifting portion 20, the electronic control unit 40 controls output torque TM1 of the first electric motor M1, serving as an electric motor to constitute an electrically controlled differential mechanism, so as to increase output torque TOUT by a value of inertia torque of the first electric motor M1 for the purpose of suppressing a variation in the rotation speed NE of the engine 8. Thus, no engine inertia torque occurs, enabling a reduction in shifting shock.

In the illustrated embodiment 1, inertia torque of the first electric motor M1 can be calculated based on the target rotation speed NM2a of the second electric motor M2 on a stage when the downshift is completed, the target rotation speed NEtgt of the engine 6, the target rotation speed NM2b of the second electric motor M2 on a stage before the shifting is commenced, and the target shifting time Δt. Accordingly, inertia torque of the first electric motor M1 can be calculated in a suitable manner.

In the first illustrated embodiment, inertia torque of the first electric motor M1 can be calculated based on a variable NM2(t)−NM2(t−Δt2) of the actual rotation speed NM2 of the second electric motor M2(t) and the target rotation speed NTtgt of the engine 6 on the stage when the downshift is completed. Accordingly, inertia torque of the first electric motor M1 can be calculated in a suitable manner.

In the first illustrated embodiment, with the first and second electric motors M1, M2 controlled in operating states, the differential portion 11 can perform a differential action to serve as the continuously variable transmission for enabling a continuous variation in speed ratio while making it possible to continuously vary the overall speed ratio γT of the vehicular drive system as a whole.

Subsequently, description will be made of another embodiment of the present invention. In the following description, component parts mutually related to the embodiments in common bear like reference numerals to omit description of the same component parts.

Embodiment 2

With an embodiment 2, the control device further includes, in addition to the various means shown in FIG. 6, engine rotation speed variation rate determining means 60. The engine rotation speed variation rate determining means 60 determines whether or not a variation rate ΔNE/Δt of the engine rotation speed NE per minimal time, detected with, for instance, an engine rotation speed sensor 94, exceeds a predetermined given value "d". As used herein, the term "given value d" refers to an upper limit of or nearly an upper limit value of the variation rate ΔNE/Δt of the engine rotation speed, no fear occurs for the first electric motor M1 to generate reaction torque in excess to cause the engine 6 to rotate in reverse direction. Here the upper limit means one that when executing the step of increasing torque based on the rotation speed variation rate ΔNM1 of the first electric motor M1 calculated by the M1 rotation speed variation rate calculating means 54. Such a value is preliminarily calculated on experiment or simulation.

Figure 11:
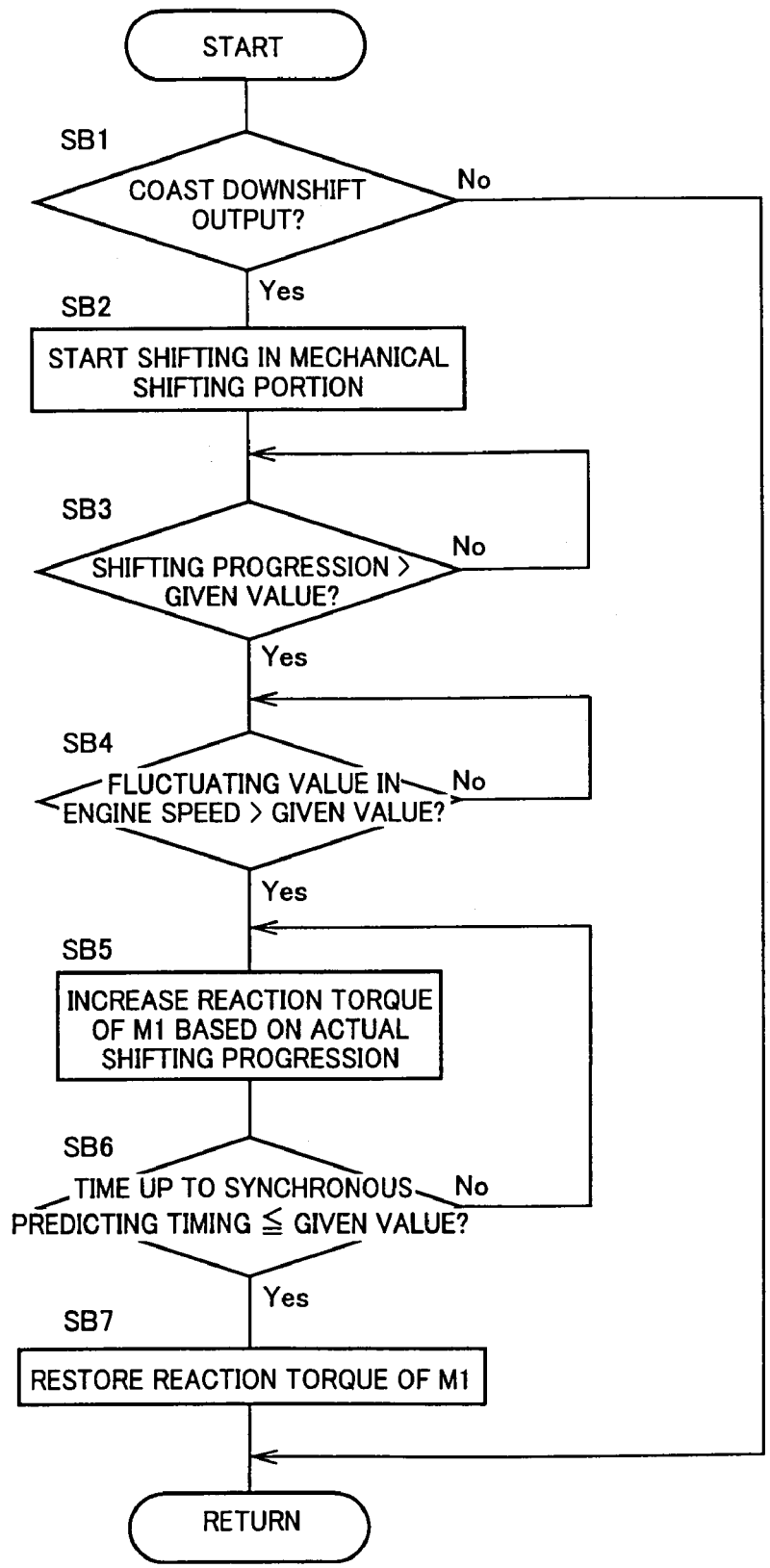
FIG. 11 is a flowchart illustrating a basic sequence of control operations to be executed with the electronic control unit shown in FIG. 6, i.e., a basic sequence of torque control operations of another embodiment to be executed by the first electric motor, corresponding to FIG. 9.
Figure 12:
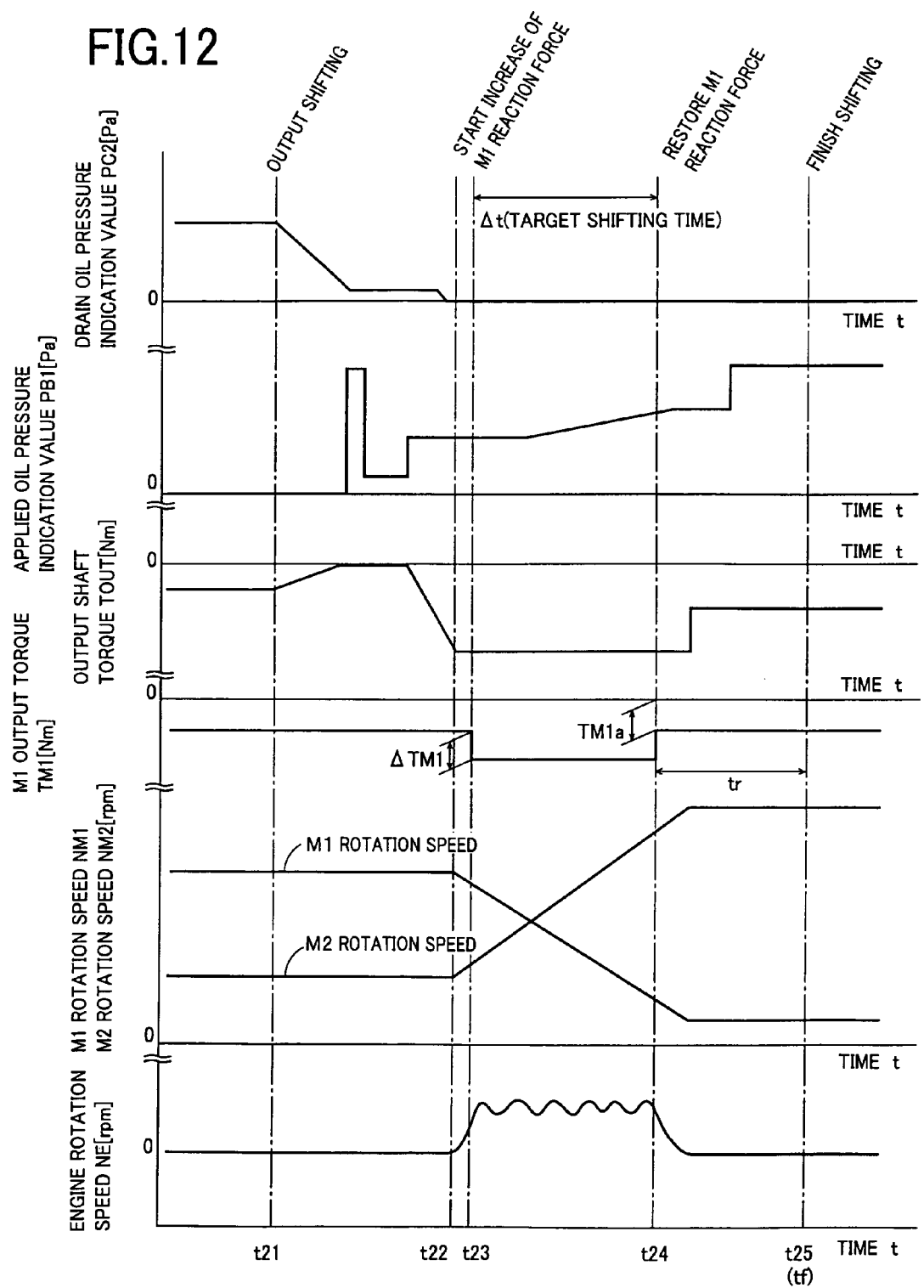
FIG. 12 is a timing chart, illustrating the control operations shown in FIG. 11, which is a view representing the control operations to be executed when a coast downshift 3rd→2nd is executed in the step-variable shifting portion with the shifting mechanism placed in a continuously variable shifting state, corresponding to FIG. 10.

FIG. 11 is a flowchart illustrating an essence of control operations to be executed with the electronic control unit 40 in the second embodiment, that is, a basic sequence of torque control operations to be executed in the first electric motor to initiate the downshift. Such a basic sequence is repeatedly executed on an extremely short cycle time in the order of, for instance, several milliseconds to several tens milliseconds. Further, FIG. 12 is a timing chart illustrating the control operations and shows the control operations to be executed when the step-variable shifting portion 20 initiates an upshift in 3rd→2nd gear position with the shifting mechanism 10 placed in the continuously variable shifting state.

In the flowchart shown in FIG. 11, steps SB1 to SB3 and steps SB5 to SB7 correspond to SA1 to SA3 and SA5 to SA7 of FIG. 9, respectively, with similar control operations being executed in these steps. Hence, detailed description of these steps is herein omitted. That is, the flowchart of FIG. 11 differs from the flow chart shown in FIG. 9 in that SB4 is newly provided between SB3, corresponding to SA3, and SB5 corresponding to SA5 while step, corresponding to SA4, is omitted.

In SB5 corresponding to the engine rotation speed variation rate determining means 60, the operation is executed to determine whether or not the variation rate ΔNE/Δt of the engine rotation speed NE per minimal time exceeds the predetermined given value "d". Here, by using the engine rotation speeds NE (t) and NE (t–Δt) detected by, for instance, the engine rotation speed sensor 94 at the current fine and another time in the past by a minimal time Δt from the current time, respectively, the variation rate ΔNE/Δt of the engine rotation speed NE per minimal time is calculated in a formula expressed as:

$$\Delta NE/\Delta t = (NE(t) - NE(t - \Delta t))/\Delta t$$

If the determination in SB5 is made positive, operations subsequent to SB6 are executed. In contrast, if the determination in SB5 is made negative, the current step is repeatedly executed, after which the operation remains in a standby state until the determination in the current step is made positive.

In FIG. 12, if a shifting output for the downshift is present at time t21 (in SB1), the step-variable shifting portion 20 executes the shifting at time t21. That is, the clutch engaging hydraulic pressure PB1 is caused to increase for the hydraulically operated friction coupling element B1 to be coupled for the shifting. Meanwhile, the clutch engaging hydraulic pressure PC2 is caused to decrease for the hydraulically operated friction coupling element C2 to be uncoupled for the shifting (in SB2). At time t22, the rotation speeds NM1 and NM2 of the first and second electric motors M1 and M2 are caused to vary.

As a result, at time t23 (in SB4) in which the shifting progression calculated based on the engine rotation speed NE exceeds the given value, and the engine rotation speed variation rate ΔNE/Δt exceeds the given value "d", the first electric motor M1 is caused to generate increased output torque TM1 (in SB5). In addition, at time t24 (in SB6) representing a time earlier than time t25, corresponding to a synchronous timing predicting time "tf", by the given time "td", the increase in output torque TM1 is terminated (in SB7).

With the embodiment 2, output torque TM1 of the first electric motor M1 is controlled when the variation rate ΔNE/Δt of the engine rotation speed NE of the engine 8 exceeds the given value "d". Accordingly, the engine rotation speed NE is maintained at a target value higher than the zeroed rotation, that is, the operation is executed so as to prevent an engine crankshaft from rotating in a reverse direction.

Embodiment 3

With the embodiment 3, the control device further includes, in addition to the various means shown in FIG. 6, preceding torque increasing means 68. The preceding torque increasing means 68 allows the first electric motor M1 to increase torque by a given value ΔTM1p, for a period starting from a timing earlier than the beginning of the shifting of the step-variable shifting portion 20 by a given time "tp" to a timing when the step-variable shifting portion 20 begins to execute the shifting. As used herein, the term "beginning of shifting" refers to an operation in which the effective shifting is commenced, and specifically it is decided based on whether or not for instance, inertia phase is commenced.

Here, values of the given time "tp" and given value ΔTM1p of increased torque are preliminarily decided on experiment or simulation so as to compensate a response delay incurred from the beginning of the shifting output to the beginning of the inertia phase. Especially, the given time "tp" serves to compensate the response delay in the first electric motor M1 and is made equal to or nearly equal to a time period required for a command value of output torque to be set to TM1p and torque to be actually output.

Figure 13:
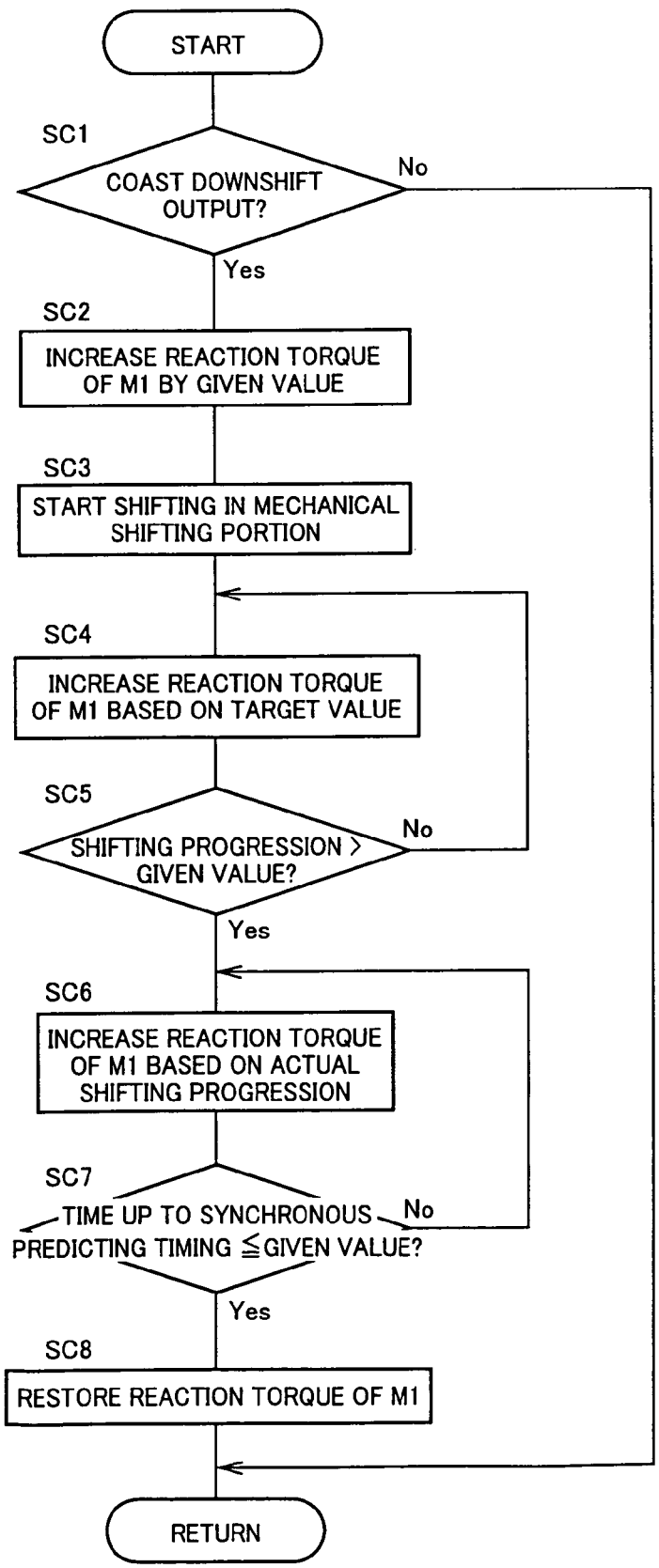
FIG. 13 is a flowchart illustrating a basic sequence of control operations to be executed with the electronic control unit shown in FIG. 6, i.e., a basic sequence of torque control operations of another embodiment to be executed by the first electric motor, correspond to FIG. 9.

FIG. 13 is a flowchart illustrating an essence of control operations to be executed with the electronic control unit 40 in the embodiment 3, that is, a basic sequence of torque control operations to be executed in the first electric motor M1 to initiate the downshift. Such a basic sequence is repeatedly executed on an extremely short cycle time in the order of, for instance, several milliseconds to several tens milliseconds. Further, FIG. 14 is a timing chart illustrating the control operations and shows the control operations to be executed when the step-variable shifting portion 20 initiates an upshift in 3rd→2nd gear position with the shifting mechanism 10 placed in the continuously variable shifting state.

In the flowchart shown in FIG. 13, steps SC1 and SC3 to SC8 correspond to SA1 and SA2 to SA7 of FIG. 9, respectively, with similar control operations being executed in these steps. Hence, detailed description of these steps is herein omitted. That is, the flowchart of FIG. 13 differs from the flow chart shown in FIG. 9 in that SC2 is newly provided between SC1 corresponding to SA1, and SC3 corresponding to SA2.

SC2 of FIG. 13 corresponds to the preceding torque increasing means 68. It causes, after a coast downshift being output, the first electric motor M1 to generate torque TM1 at a value increased by the given value ΔTM1$p$, for a time interval starting from the beginning of the inertia phase wherein the effective shifting is commenced, to a time earlier than the beginning of the inertia phase by the given time "tp". When this takes place, during a time period from the output of the coast downshift to the beginning of the inertia phase, use is made of, for instance, a value resulting from the calculation executed on a preliminary experiment or simulation.

Figure 14:
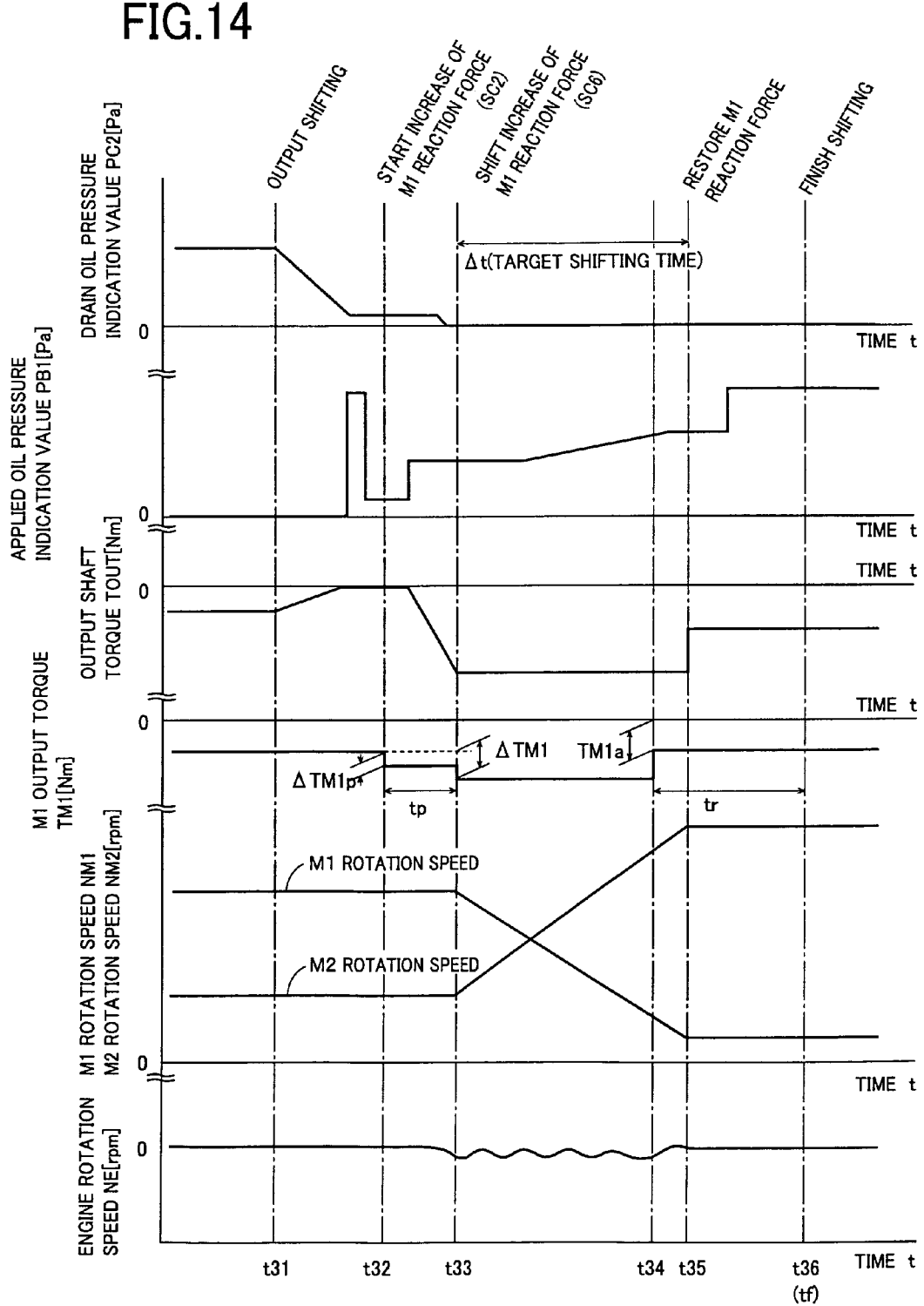
FIG. 14 is a timing chart, illustrating the control operations shown in FIG. 13, which is a view representing the control operations to be executed when a coast downshift 3rd→2nd is executed in the step-variable shifting portion with the shifting mechanism placed in a continuously variable shifting state, correspond to FIG. 10.

If the shifting output is present at time t31 (in SC1) in FIG. 14, it is predicted based on the value resulting from the calculation made on the preliminary experiment or simulation that at time t33, the effective shifting is commenced in a mechanical shifting portion (step-variable shifting portion 20). Then, at time t32 earlier than time t33 by the given time "tp", the first electric motor M1 is caused to generate torque TM1 at the value increased by the given value ΔTM1$p$ (in SC2). At time t33 in which the mechanical shifting portion (step-variable shifting portion 20) begins to execute the effective shifting, the torque control of the first electric motor M1 is executed based on the rotation speed variation rate ΔNM1$p$ of the first electric motor M1 calculated by the M1 rotation speed variation rate estimating means 52 (in SC4). In addition, the operations subsequent to such step are similar to those subsequent to time t12 shown in FIG. 10, and hence description of the same is herein omitted.

With the embodiment 3, the first electric motor M1 is caused to generate torque TM1 at the value increased by the given value ΔTM1$p$ during the downshift being executed and before the inertia phase is commenced. Accordingly, this results in the suppression of deterioration in shifting shock or variation in tone quality resulting from an increase in a fluctuating range of the engine rotation speed NE. With the embodiment 3, especially, the control can be executed in consideration of the response delay incurred in the first electric motor M1 during the operation thereof. This makes it possible to satisfy more severe condition against a fluctuation in the engine rotation speed during the shifting being executed. During the shifting where, for instance, the engine rotation speed is sufficiently higher than a zeroed value, there is less risk to occur for the engine to rotate in the reverse direction. Thus, the embodiment 3 enables a reduction in fluctuation of the engine rotation speed, taking a priority to suppress deterioration in shifting shock or the variation in tone quality.

In the foregoing, while the present invention has been described above with reference to the embodiments 1 to 3 shown in the drawings, the present invention may be implemented in other modes.

While in the various illustrated embodiments set forth above, for instance, the differential portion 11 is associated with the first and second electric motors M1, M2 to be placed in the electrically controlled differential state to be rendered operative as the continuously variable transmission for enabling the speed ratio to be continuously varied, the present invention is not limited to such a concept. Controlling the operating states of the first and second electric motors M1, M2 also allows the differential portion 11 to act as an electrically controlled multiple-stage transmission in which a large number of fixed speed ratios are established in a finely varied stepwise pattern. In the illustrated invention, the expression "the differential portion 11 is rendered operative to act as the continuously variable transmission" is meant to also include a situation under which the differential portion 11 is rendered operative to act as the electrically controlled multiple-stage transmission.

Figure 15:
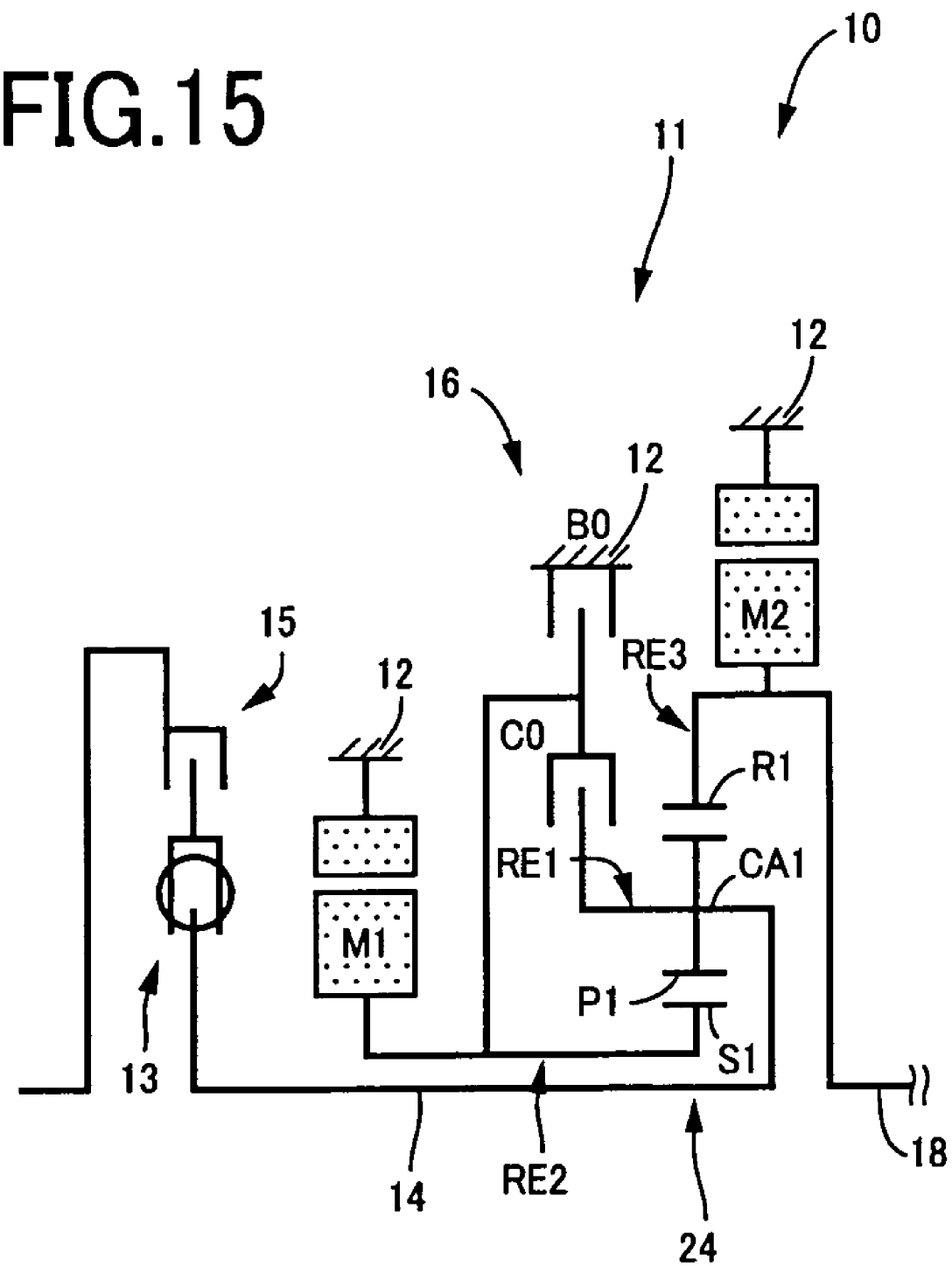
FIG. 15 is a skeleton view, representing a structure of a power distributing mechanism forming a part of a vehicular drive system of another embodiment to which the present invention is applied, corresponding to a part of the structure shown in FIG. 1.

Further, while the various illustrated embodiments have been described with reference to a case wherein the power distributing mechanism 16, acting as the differential portion 11, takes the form of the structure shown in FIG. 1, the present invention is not limited to such a structure. As shown in FIG. 15, for instance, the power distributing mechanism 16 may take the form of a structure that includes the switching clutch C0, disposed between the first carrier CA1 and the first sun gear S1 forming the rotary elements of the first planetary gear set 24, and the switching brake B0 disposed between the first sun gear S1 and the case 12.

Even in a case where the switching clutch C0 and the switching brake B0 are disposed in a structure as shown in FIG. 15, the presence of such component elements remained under uncoupled states is not actually differently from the states shown in FIG. 1 and the power distributing mechanism 16 performs the differential action. In contrast, with the switching clutch C0 and the switching brake B0 remained coupled, the power distributing mechanism 16 is brought into a non-differential state with no differential action being effectuated. Thus, a whole of the vehicular drive system, comprised of the differential portion 11 placed in the non-differential state and the step-variable shifting portion 20 in combination, is rendered operative as a step-variable transmission.

While the switching means 56 has been described with reference to the structure that performs the switching when the shifting progression C arrived at the given progression C0, the given progression C0 may have values different from each other for the gear positions to be shifted.

While the shifting progression calculating means 58 calculates the shifting progression based on the current engine rotation speed on the ground that the linear relationship (see the formula (4)) exists between the engine rotation speed, appearing before the execution of the shifting, and the engine rotation speed appearing after the completion of the shifting, the present invention is not limited to such a concept. Such a calculation may be executed based on, for instance, a non-linear relationship. In an alternative, upon experimentally obtaining the fluctuation in the actual engine rotation speed on a stage before and after the shifting, resulting data may be plotted on a map to allow relevant data to be suitably retrieved from such a map depending upon needs.

While the shifting progression calculating means 58 is operated upon using the rotation speed NM2 of the second electric motor M2 detected by the resolver, the rotation speed NM of the second electric motor M2 may be calculated using another method.

While the returning means 66 is effectuated when the given time "tr" has elapsed in the synchronous completion predicting time "tf" predicted by the synchronous timing predicting means 70, the present invention is not limited to such a concept. For instance, such an operation may be executed when the switching means 56 (shifting progression calculating means 58) decides that the shifting achieves a certain progression.

The synchronous timing predicting means 70 has been described with reference to a case wherein the synchronous timing is predicted using the map, the present invention is not limited to such a concept.

The embodiment 2 is exemplarily illustrated in FIG. 12 with reference to a case wherein the engine rotation speed NE is raised during the shifting of the automatic transmission being executed. However, the present invention is not limited to such a feature and may include a case wherein the engine rotation speed NE is raised during the shifting being executed. While the embodiments 1 to 3 have been exemplified with reference to a case wherein the engine rotation speed NE lies at a value in the vicinity of a zeroed rotation speed during the shifting being executed as shown in FIGS. 10 and 14. However, the present invention is not limited to such a concept and may include a case wherein the engine rotation speed NE is raised during the shifting being executed.

While in the flowchart shown in FIG. 11, the operation is executed in SB3 to determine that the shifting progression exceeds a certain progression after which the operation is executed in S14 to determine that the engine rotation speed variation rate exceeds the given value, the present invention is not limited such sequences and such operations may be executed in a reversed sequence.

The control methods of the embodiments 1 to 3 have been provided in independent embodiments, respectively. However, these control methods may be executed in combination or may be switched depending on variation in a running condition and an operating point with the engine rotation speed NE having a threshold value.

While with the illustrated embodiments have been described above with reference to the case of the coast downshift, the present invention is not limited to such a concept and the present invention has a certain advantageous effect even if a normal downshift is executed.

While with the illustrated embodiments have been described above with reference to the case in which the differential portion 11 is rendered operative as the so-called continuously variable transmission for the speed ratio to be continuously varied, the present invention is not limited to such a concept. For instance, the differential portion 11 may be rendered operative as a step-variable transmission in which varying the operating states of the electric motors disposed in the differential portion allows a speed ratio to be varied in multiple gear positions different from each other in speed ratio.

What is claimed is:

1. A control device for a vehicular drive system including:
an electrically operated differential portion disposed in a power transmitting path between an engine and drive wheels for controlling an operating state of at least one electric motor connected to a rotary element of the differential portion for thereby controlling a differential state between an input-shaft rotation speed and an output-shaft rotation speed; and a shifting portion forming a part of the power transmitting path and functioning as a step-variable automatic shifting portion;
the control device being comprised to perform a control of output torque of the electric motor during a downshift of the step-variable shifting portion so as to suppress a fluctuation in a rotation speed of the engine,
wherein, for the control of output torque of the electric motor, the control device increases a reaction torque by an inertia torque of the electric motor.

2. The control device for a vehicular drive system according to claim 1, wherein
the at least one electric motor comprises two electric motors;
the differential portion includes a differential mechanism including a first element connected to the engine, a second element connected to a first electric motor, and a third element connected to a power transmitting member, and a second electric motor disposed in the power transmitting path between the power transmitting member and the drive wheels;
the control device controls the output torque of the first electric motor so as to suppress the rotation speed of the engine during the downshift of the step-variable shifting portion; and
for the control of the first electric motor, the reaction torque is increased by the inertia torque of the first electric motor.

3. The control device for a vehicular drive system according to claim 2, wherein the control device calculates the inertia torque of the first electric motor based on a target rotation speed of the second electric motor appearing upon completion of the downshift, a target rotation speed of the engine appearing upon completion of the downshift, a rotation speed of the second electric motor before commencement of the shifting, and a target shifting time.

4. The control device for a vehicular drive system according to claim 2, wherein the control device calculates the inertia torque of the first electric motor based on a variation rate in an actual rotation speed of the second electric motor and a target rotation speed of the engine upon completion of the downshift.

5. The control device for a vehicular drive system according to claim 3, wherein the control device calculates the inertia torque of the first electric motor based on a variation rate in an actual rotation speed of the second electric motor and a target rotation speed of the engine upon completion of the downshift.

6. The control device for a vehicular drive system according to claim 2, wherein the control device performs the control of the output torque of the first electric motor when a variation rate of the rotation speed of the engine exceeds a given value.

7. The control device for a vehicular drive system according to claim 2, wherein the control device increases the output torque of the first electric motor by a given value before commencement of the inertia phase during execution of the downshift.

8. The control device for a vehicular drive system according to claim 1, wherein the control device renders the electrically operated differential portion operative as a continuously variable shifting mechanism by controlling the operating state of the electric motor.

\* \* \* \* \*